(12) United States Patent
Chan et al.

(10) Patent No.: US 11,974,701 B2
(45) Date of Patent: May 7, 2024

(54) COOKWARE VESSEL WITH REMOVABLE HANDLE

(71) Applicant: Meyer Intellectual Properties Limited, Kowloon (HK)

(72) Inventors: Hing Fai Chan, San Ramon, CA (US); Stanley Kin Sui Cheng, Hillsborough, CA (US)

(73) Assignee: Meyer Intellectual Properties Limited (VG)

( * ) Notice: Subject to any disclaimer, the term of this patent is extended or adjusted under 35 U.S.C. 154(b) by 300 days.

(21) Appl. No.: 17/489,424

(22) Filed: Sep. 29, 2021

(65) Prior Publication Data

US 2022/0095845 A1 Mar. 31, 2022

Related U.S. Application Data

(60) Provisional application No. 63/084,786, filed on Sep. 29, 2020.

(51) Int. Cl.
*A47J 45/07* (2006.01)

(52) U.S. Cl.
CPC .................. *A47J 45/071* (2013.01)

(58) Field of Classification Search
CPC .............................. A47J 45/071; A47J 45/072

(Continued)

(56) References Cited

U.S. PATENT DOCUMENTS

| 3,108,316 | A | * | 10/1963 | Peale | ................. | A47J 45/071 |
| | | | | | | 220/759 |
| 6,739,473 | B2 | * | 5/2004 | Kahler | ................. | A47J 45/071 |
| | | | | | | 220/759 |

(Continued)

FOREIGN PATENT DOCUMENTS

| CN | 203302936 U | 11/2013 |
| DE | 202015105628 U1 | 1/2016 |

(Continued)

OTHER PUBLICATIONS

Written Opinion of the International Searching Authority dated Nov. 18, 2021 in connection with PCT Application No. PCT/US2021/052722.

(Continued)

*Primary Examiner* — J. Gregory Pickett
*Assistant Examiner* — Niki M Eloshway
(74) *Attorney, Agent, or Firm* — Akerman LLP

(57) ABSTRACT

According to one example, a cookware vessel includes a bracket coupled to an exterior of a vessel, and a detachable handle. The handle includes a grip portion, a coupling fixedly attached to the grip portion, an actuator rotatingly coupled to the handle, and a spring. The coupling has a channel that is configured to surround at least a portion of an upper horizontally extending rod of the bracket. The actuator has a top portion configured to engage and disengage an upper edge of the bracket when the actuator is rotated forward and backward. The actuator also has hooks configured to engage and disengage a lower horizontally extending rod of the bracket when the actuator is rotated forward and backward. The spring is configured to apply a force to the actuator so as to rotate the actuator forward, when the actuator is released by a user.

20 Claims, 20 Drawing Sheets

(58) Field of Classification Search
USPC .................................. 220/210, 753, 759
See application file for complete search history.

(56) References Cited

U.S. PATENT DOCUMENTS

| | | | | |
|---|---|---|---|---|
| 2007/0228056 | A1* | 10/2007 | Hoff | A47J 45/08 |
| | | | | 220/759 |
| 2016/0360929 | A1 | 12/2016 | Tarenga et al. | |
| 2019/0216251 | A1* | 7/2019 | Barberi | A47J 45/061 |
| 2020/0405100 | A1* | 12/2020 | Bucklew | A47J 37/108 |
| 2021/0298534 | A1* | 9/2021 | Montgelard | A47J 45/071 |

FOREIGN PATENT DOCUMENTS

| | | | | |
|---|---|---|---|---|
| EP | 0209461 | A1 | 1/1987 | |
| EP | 1925244 | A1 | 5/2008 | |
| EP | 2172141 | A1 | 4/2010 | |
| EP | 2250952 | A1 * | 11/2010 | ............ A47J 45/071 |
| EP | 2609842 | A1 | 7/2013 | |
| JP | 2001190433 | A * | 7/2001 | ............ A47J 45/071 |
| JP | 2003210340 | A | 7/2003 | |
| KR | 101570707 | B1 | 11/2015 | |
| WO | 2010/081261 | A1 | 7/2010 | |
| WO | 2018/058742 | A1 | 4/2018 | |

OTHER PUBLICATIONS

International Search Report dated Nov. 18, 2021 in connection with PCT Application No. PCT/US2021/052722.

* cited by examiner

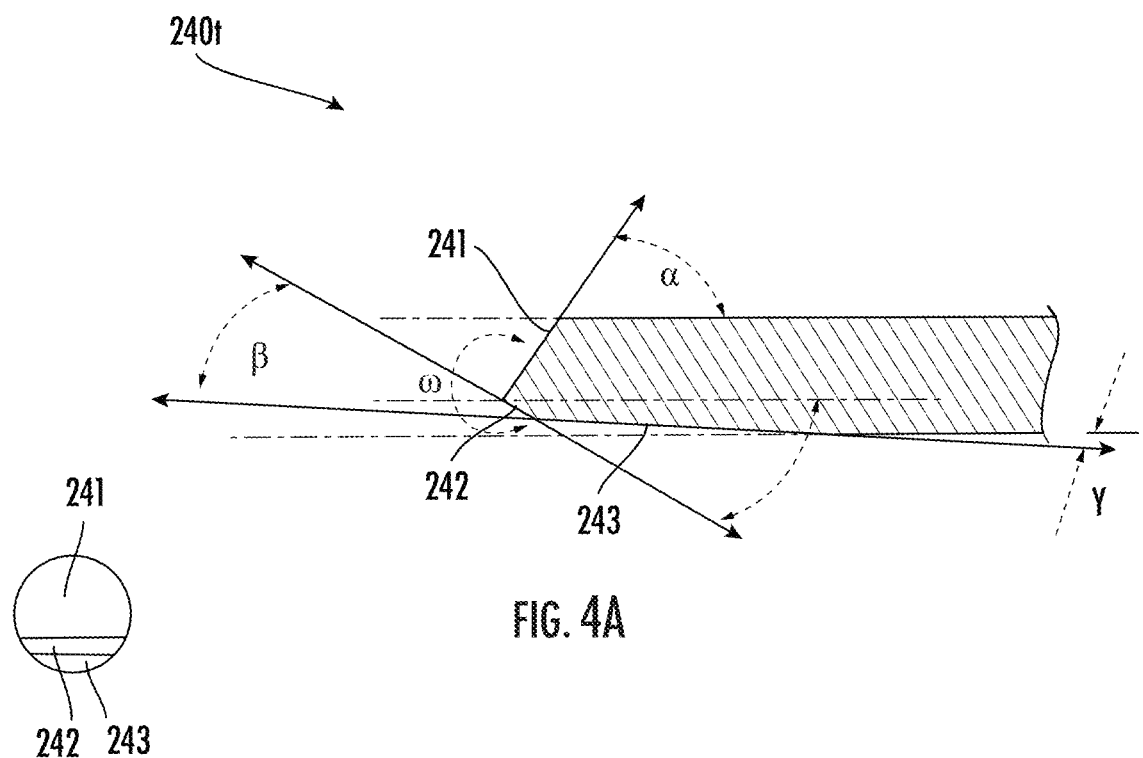
FIG. 4A
FIG. 4B
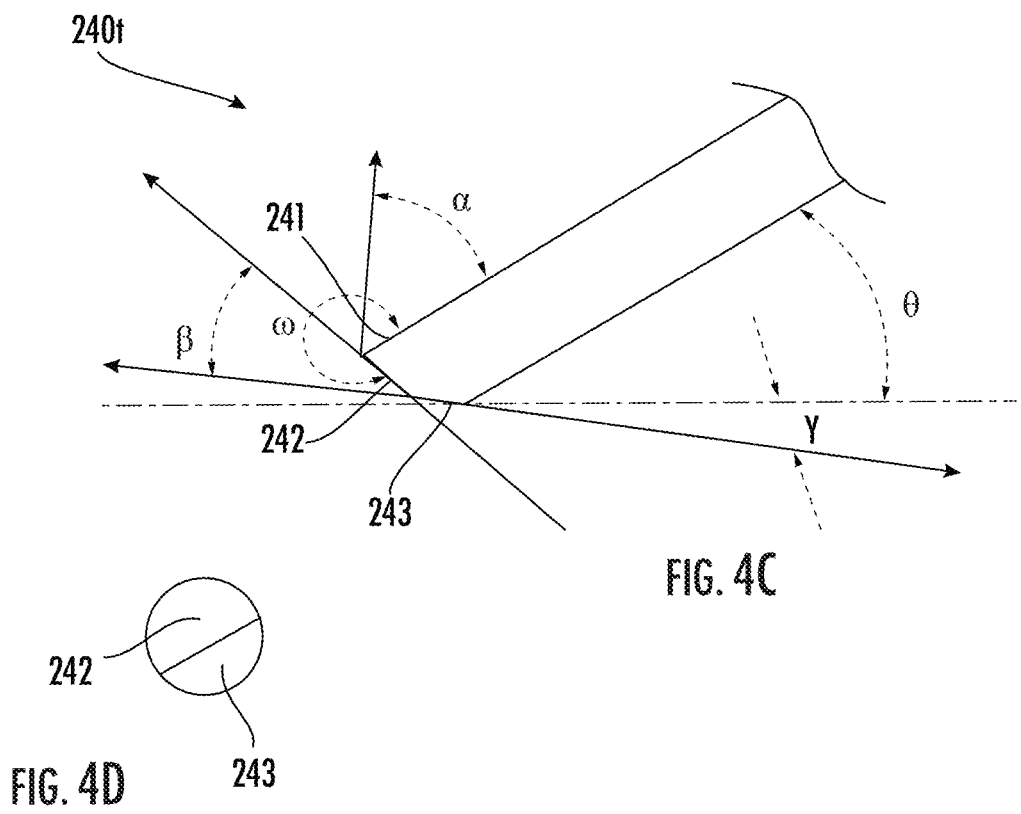
FIG. 4C
FIG. 4D

COOKWARE VESSEL WITH REMOVABLE HANDLE

CROSS REFERENCE TO RELATED APPLICATIONS

This application claims priority to U.S. Provisional Patent Application No. 63/084,786 filed Sep. 29, 2020, the entirety of which is incorporated herein by reference.

TECHNICAL FIELD

This disclosure relates generally to cookware vessels, and more specifically to a handle that is detachable from a cookware vessel (such as a pot or pan), and also a cookware vessel adapted to receive said handle.

BACKGROUND

Traditionally, a cookware vessel (such as a pot or a pan) includes a handle that is permanently attached to the cookware vessel. Other traditional cookware vessels include a handle that is detachable from the cookware vessel. Such traditional detachable handles, however, may be deficient.

SUMMARY

According to a first example, a cookware vessel includes a vessel, a bracket, and a detachable handle. The vessel has a bottom portion surrounded by a substantially upright sidewall that terminates at a rim to define an interior volume for holding a food item. The bracket is coupled to an exterior of the substantially upright sidewall adjacent to the rim. The bracket has a channel that extends upward from a lower opening in an underside of the bracket. The handle includes an elongated grip portion, an elongated plate, a U-shaped coupling, an elongated rod, an actuator, and a spring. The elongated grip portion has a distal end and a spaced apart proximal end, in which the distal and proximal ends thereof define a principal axis of the handle. The elongated plate is disposed within at least a portion the elongated grip portion, and extends outward in a forward direction from the proximal end of the elongated grip portion. The elongated plate has an elongated concave depression on an underside of the elongated plate that extends along the same direction as the principal axis. The U-shaped coupling has an outer vertical plate and a spaced apart inner vertical plate that are each connected to the other at a bottom portion thereof. The inner vertical plate has an upper end that is coupled to a proximal end of the elongated plate. The outer vertical plate is configured to be received within the channel of the bracket when the handle is in a secure latched engagement to the vessel. The elongated rod is disposed to laterally translate along the underside of the elongated plate within the elongated concave depression. When the elongated rod is moved forward, a tip of the elongated rod is configured to extend through an aperture in the inner vertical plate so as to be positioned in-between the inner and outer vertical plates. When the elongated rod is moved backward, the tip of the elongated rod is configured to retract back through the aperture in the inner vertical plate. The tip of the elongated rod has a nonsymmetric bevel shape defined by an upper tapered edge and a lower tapered edge that meet at a vertex disposed below a center line of the elongated rod. The upper tapered edge is longer than the lower tapered edge in a principal axis of the elongated rod. The actuator is coupled, directly or indirectly, to the elongated rod, and is configured to be manually moved by a user. The actuator is further configured, when moved by the user, to directly or indirectly move the elongated rod backward so as to cause the tip of the elongated rod to retract back through the aperture in the inner vertical plate. The spring is coupled to the elongated rod. The spring is configured to apply a force to the elongated rod so as to move the elongated rod forward, when the actuator is released by the user, to cause the tip of the elongated rod to extend through the aperture in the inner vertical plate so as to be positioned in-between the inner and outer vertical plates.

Another example is any such cookware vessel, where the outer vertical plate of the handle and the channel of the bracket have a complementary inward and upward taper on two or more opposing sides, or have a complementary inward and upward taper on three or more adjacent sides, or have a complementary inward and upward taper on four adjacent sides.

Another example is any such cookware vessel, where the bracket further includes a front face having an aperture. When the outer vertical plate of the handle is at least partially positioned within the cavity of the bracket, the tip of the elongated rod is configured to extend through the aperture of the front face of the bracket.

Another example is any such cookware vessel, where the bracket is integrated with a flange that is coupled to the exterior of the substantially upright sidewall adjacent to the rim.

Another example is any such cookware vessel, where at least a portion of the actuator is positioned on or in a bottom of the elongated grip portion.

Another example is any such cookware vessel, where at least a portion of the actuator is positioned at or in the distal end of the elongated grip portion.

Another example is any such cookware vessel, where the handle further includes a rocker arm and a pullable arm. The rocker arm is coupled directly to the actuator, and is further coupled directly to the pullable arm. The rocker arm is configured to rotate around a swivel point. The pullable arm is coupled directly to the elongated rod. The actuator is further configured, when moved by the user, to indirectly move the elongated rod backward by rotating the rocker arm, which causes the pullable arm to directly move the elongated rod backward.

Another example is any such cookware vessel, where the handle is configured to detach from the vessel without the user manually moving the actuator.

According to a second example, a cookware vessel includes a vessel, a bracket, and a detachable handle. The vessel has a bottom portion surrounded by a substantially upright sidewall that terminates at a rim to define an interior volume for holding a food item. The bracket is coupled to an exterior of the substantially upright sidewall adjacent to the rim. The bracket has two vertically spaced apart rods that extend horizontally along the bracket. The two rods include an upper rod and a lower rod. The handle includes a grip portion, a coupling fixedly attached to the grip portion, an actuator rotatingly coupled to the handle, and a spring coupled to the actuator. The coupling has a channel and an indented bottom portion. The channel is configured to surround at least a portion of the upper rod when positioned against the upper rod. The indented bottom portion is configured to contact a side portion of the lower rod when positioned against the lower rod. The actuator has a top portion configured to engage an upper edge of the bracket when the actuator is rotated forward and further configured to disengage from the upper edge of the bracket when the actuator is manually rotated backward by a user. The actuator further has one or more hooks that are configured to engage the lower rod of the bracket when the actuator is rotated forward and further configured to disengage from the lower rod of the bracket when the actuator is manually rotated backward by the user. The spring is configured to apply a force to the actuator so as to rotate the actuator forward, when the actuator is released by the user, to cause the top portion of the actuator to engage the upper edge of the bracket, and further to cause the one or more hooks of the actuator to engage the lower rod of the bracket.

Another example is any such cookware vessel, where the two rods extend horizontally in-between two opposing sidewalls of the bracket. Another example is any such cookware vessel, where the actuator is rotatingly coupled to a lower shell of the handle or to the coupling of the handle. Another example is any such cookware vessel, where the one or more hooks of the actuator are two horizontally spaced apart hooks. Another example is any such cookware vessel, where the two rods each have a cylindrical shape, and where the channel of the coupling has a semi-cylindrical shape.

According to a third example, a cookware vessel includes a vessel, a bracket, and a detachable handle. The vessel has a bottom portion surrounded by a substantially upright sidewall that terminates at a rim to define an interior volume for holding a food item. The bracket is coupled to an exterior of the substantially upright sidewall adjacent to the rim, and has a channel that extends upward from a lower opening in an underside of the bracket. The handle includes a coupling fixedly attached to the handle, an actuator rotatingly coupled to the coupling, and a spring coupled to the actuator. The coupling has an outer vertical plate that is configured to be received within the channel of the bracket. The actuator has a top portion that is configured to engage an upper edge of the bracket when the actuator is rotated forward, and that is further configured to disengage from the upper edge of the bracket when the actuator is manually rotated backward by a user. The spring is configured to apply a force to the actuator so as to rotate the actuator forward, when the actuator is released by the user, to cause the top portion of the actuator to engage the upper edge of the bracket.

Another example is any such cookware vessel, where the outer vertical plate of the coupling comprises two spaced apart upright cones, and where the channel of the bracket comprises two spaced apart conical slots. Another example is any such cookware vessel, where the spring is tilted upward and forward relative to the handle.

According to a fourth example, a cookware vessel includes a vessel, a bracket, and a detachable handle. The vessel has a bottom portion surrounded by a substantially upright sidewall that terminates at a rim to define an interior volume for holding a food item. The bracket is coupled to an exterior of the substantially upright sidewall adjacent to the rim. The bracket has a channel that extends upward from a lower opening in an underside of the bracket. The handle includes a grip portion, a U-shaped coupling that is coupled to the grip portion, a rod, an actuator, and a spring. The U-shaped coupling has an outer vertical plate and a spaced apart inner vertical plate each connected to the other at a bottom portion. The outer vertical plate is configured to be received within the channel of the bracket, and the inner vertical plate has an aperture. The rod is configured to laterally translate along the handle. When the elongated rod is moved forward, a tip of the elongated rod is configured to extend through the aperture in the inner vertical plate so as to be positioned in-between the inner and outer vertical plates. When the elongated rod is moved backward, the tip of the elongated rod is configured to retract back through the aperture in the inner vertical plate. The rod has two stops that project orthogonally from the rod. The actuator has an aperture through which the rod extends so that a back portion of the actuator is in contact with a forward portion of the two stops of the rod. The actuator is configured to be manually moved by a user, and is further configured, when moved by the user, to move the rod backward so as to cause the tip of the rod to retract back through the aperture in the inner vertical plate. The spring has an aperture through which the rod extends so that a forward portion of the spring is in contact with a back portion of the two stops of the rod. The spring is configured to apply a force to the rod so as to move the rod forward, when the actuator is released by the user, to cause the tip of the rod to extend through the aperture in the inner vertical plate so as to be positioned in-between the inner and outer vertical plates.

In a fifth example, a cookware vessel comprises a vessel having a bottom portion surrounded by substantially upright sidewalls that terminate at a rim to define an interior volume for containing a fluid, a bracket coupled to an exterior of the substantially upright sidewall proximal to the rim, in which the bracket has a channel that extends upward from a lower opening in an underside of the bracket for receiving a removable portion of a handle, the handle being configured for replaceable detachment from the bracket and comprising; an elongated grip portion having a distal end and a spaced apart proximal end, in which the distal and proximal ends define a principal axis of the handle, an elongated plate disposed within the elongated grip portion that extends from a position between the proximal and distal ends of the grip portion to a proximal end disposed beyond the proximal end of the grip portion, in which the elongated plate has an elongated concave depression on the underside thereof that extends along the same direction as the principal axis, a U-shaped coupling having an outer vertical plate and a spaced apart inner vertical plate each connected to the other at a bottom thereof by a lateral section, in which the inner vertical plate has an upper end that is coupled to the proximal end of the elongated plate, an outer vertical plate is configured to be received within the channel of the bracket when the handle is in secure latched engagement to the cookware vessel, an elongated rod disposed to laterally translate along and underside of the elongated plate such that a proximal end thereof can be removably positioned from between the inner and outer vertical plates by passing through a penetration in the inner vertical plate, in which the proximal end of the elongated rod has a nonsymmetric bevel shape defined by an upper tapered edge and a lower tapered edge that meet at a vertex disposed below a center line of the elongated rod, in which the upper tapered edge is longer than the lower tapered edge in a principal axis of the elongated rod, an actuator coupled to the elongated rod and having a lower portion that extends beyond an underside of the grip portion, in which the actuator is configured to latch in a first position that withdraws the proximal end of the elongated rod from the penetration in the inner vertical plate and a spring coupled to the elongated rod that is operative to urge the nonsymmetric bevel on the elongated rod through the penetration in the inner vertical plate when the actuator is released.

Another example is any such cookware vessel in which the outer vertical plate and the channel of the bracket have a complementary inward and upward taper on two or more opposing sides. Another example is any such cookware vessel in which the outer vertical plate and the channel of the bracket have a complementary inward and upward taper on three or more adjacent sides. Another example is any such cookware vessel in which the outer vertical plate in the channel of the bracket have a complementary inward and upward taper on four adjacent sides. Another example is any such cookware vessel in which the elongated plate is secured within the grip portion of the handle by two or more screws that extend from an underside of the handle up through penetrations within the elongated plate to be received within complementary threaded cavities within an upper portion of the handle.

In a sixth example, a cookware vessel comprises a vessel having a bottom portion surrounded by substantially upright sidewalls that terminate at a rim to define an interior volume for containing a fluid, a bracket coupled to an exterior of the substantially upright sidewall proximal to the rim, in which the bracket has a channel that extends upward from a lower opening in an underside of the bracket for receiving a removable portion of a handle, the handle being configured for replaceable detachment from the bracket and comprising; a handle with an elongated grip portion having a distal end and a spaced apart proximal end, in which the distal and proximal ends define a principal axis of the handle, a coupling at a proximal end of the elongated grip portion configured for entering the channel of the bracket, an elongated rod disposed to laterally translate within at least a portion of handle, the elongated rod having a beveled tip with at least two facets, a spring coupled to the elongated rod that is operative to urge the beveled tip to enter an aperture in the bracket when the coupling enters the channel, an actuator coupled to the elongated rod that extends outward from a portion of the handle that is configured to laterally translate the elongated rod to withdraw the tip from aperture in the bracket.

Another example is any such cookware vessel in which the beveled tip is configured to urge the elongated rod backward to store energy in the spring when an upper portion of one of the rod and an upper bevel on the tip first encounters the bracket as the coupling is inserted in the channel. Another example is any such cookware vessel in which the lower bevel of the tip is disposed to act as a wedge on a lower edge of the aperture so that remaining stored energy in the spring urges the coupling further upward into the channel.

According to a seventh example, a cookware article is configured with a bracket on an exterior side wall for receiving a removable handle. The bracket has an interior channel that extends from an opening in an underside that receives an arm or plate of the U-shaped coupling. The U-shaped coupling on the end of an elongated plate that extends into a grip portion of the handle. The elongated plate has a concave depression on an underside that provides a guiding surface for the elongated rod to translate along the plate such that a beveled end thereof can extend through penetration in the U-shaped coupling to secure the coupling within the bracket. The interior channel of the bracket and the portion of the U-shaped coupling that is received therein have a complementary upward and inward taper that are urged into secured contact by a spring that urges the beveled end to extend beyond the bracket between the opposing arms that form the U-shaped coupling.

BRIEF DESCRIPTION OF THE FIGURES

For a more complete understanding of the present disclosure and one or more examples of the features and advantages of the present disclosure, reference is now made to the following description, taken in conjunction with the accompanying drawings, in which:

FIG. 1C is a section view of the bracket taken at section line C-C in FIG. 1B, whereas

FIG. 4A is an expanded cross section elevation view of an alternative beveled portion of an elongated rod of the cookware handle configured to secure a tight engagement of the bracket and handle.

FIG. 4B is a front elevation view of the elongated rod in FIG. 4A that is orthogonal to the section view therein.

FIG. 4C is an expanded cross section elevation view of another alternative beveled portion of a rod of the handle configured to secure a tight engagement of the bracket and handle.

FIG. 4D is a front elevation view of the elongated rod in FIG. 4C that is orthogonal to the section view therein.

DETAILED DESCRIPTION

Embodiments of the present disclosure are best understood by referring to FIGS. 1A-12J of the drawings, like numerals being used for like and corresponding parts of the various drawings.

As is discussed above, a cookware vessel (such as a pot or a pan) includes a handle that is permanently attached to the cookware vessel. Other traditional cookware vessels include a handle that is detachable from the cookware vessel. Such traditional detachable handles, however, may be deficient. For example, such traditional detachable handles require considerable mechanical complexity, as well as a particular structure on the cookware vessel for engaging the detachable handle. This particular structure can be an outward extending flange with a lockable mating feature designed to engage an internal fixture of the detachable handle. As another example, a problematic deficiency in traditional detachable handles is the lack of a snug engagement with the receiving component on the cookware vessel. This results in so called "play" of the handle, in which the handle can move in different directions to some extent without a corresponding displacement of the cookware vessel. This can be annoying and distracting to users, as it leads to uncertainty as to whether the handle is securely connected to the cookware vessel. It can also lead to spillage of food when the user moves the cookware vessel rapidly, as "play" can result in a lack of initial movement, leading the user to apply excessive force. However, after a slight lag time, this leads to a greater than desired acceleration of the vessel. The eventual deacceleration when the user stop moving the handle can cause the still moving contents of the cookware vessel to overflow the rim, thereby spilling. In contrast, the cookware vessels 1000 of FIGS. 1A-12J may address one or more of the deficiencies.

Figure 1A:
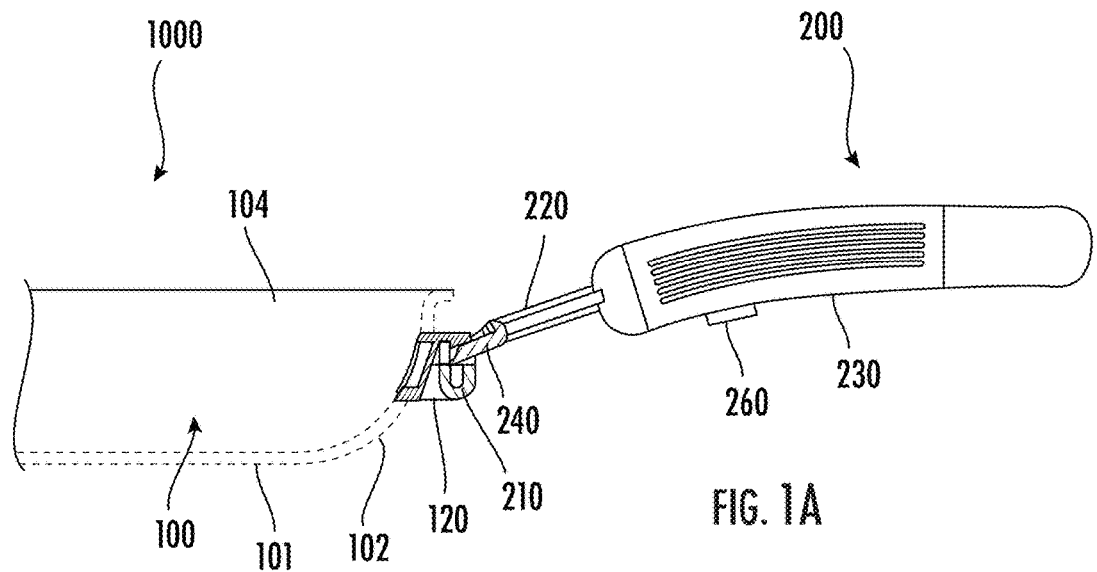
FIG. 1A is a side elevation view of an example handle attached to an example cookware vessel, where the cooking vessel is shown partially in section view.
Figure 1B:
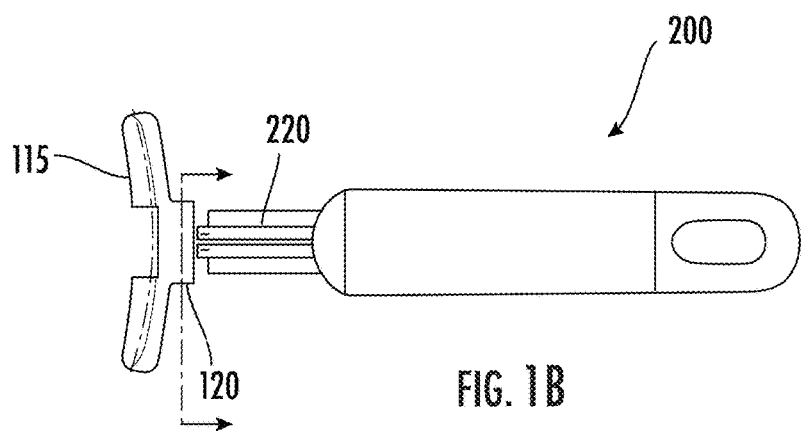
FIG. 1B is a top plan view of the handle and an example flange and bracket of the cookware vessel of FIG. 1A.
Figure 1C:
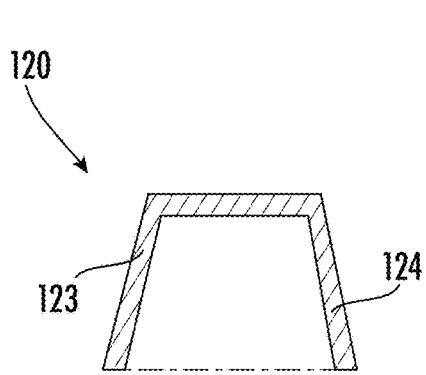
Figure 1D:
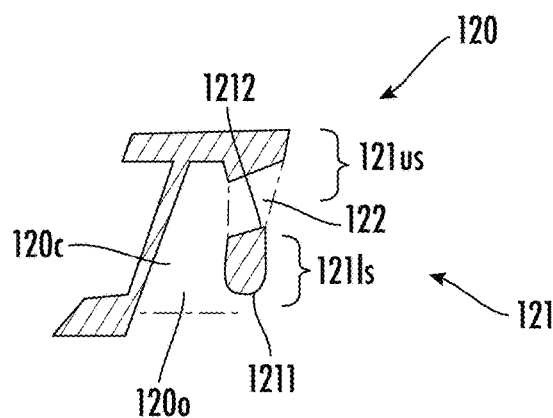
FIG. 1D is an orthogonal section view thereof taken at the center of symmetry of the handle and bracket.

FIGS. 1A-8B illustrate one example of a cookware vessel 1000. As is illustrated in FIG. 1A, the cookware vessel 1000 includes a vessel 100 for receiving and holding one or more food items (e.g., solid foods, liquids, fluids, etc.) to be cooked or heated. The vessel 100 includes a bottom 101, and a sidewall 102 that is connected to a perimeter of the bottom 101. The sidewall 102 extends upward to a rim 104 that defines an interior volume for holding the food item(s). The vessel 100 may have any shape and/or size. Also, the sidewall 102 may extend straight upward (i.e., at a 90 degree angle to the bottom 101), may slope upward (e.g., at a 70 degree angle to the bottom 101), and/or may be curvilinear. An example of a vessel 100 having a sidewall 102 that extends straight upward is illustrated in FIGS. 5A-5C.

The cookware vessel 1000 further includes a handle 200 that may be detached and reattached to the vessel 100. This detachability of the handle 200 may allow the handle 200 to be removed so that the cookware vessel 1000 may be shipped or stored compactly (due to the handle no longer protruding laterally). Furthermore, such detachability of the handle 200 may also allow a set of two or more cookware vessels 1000 to be nested together for more compact storage. The handle 200 may have any shape and/or size. For example, the handle 200 may be straight or curvilinear, and it may be disposed at any angle with respect to a vertical reference plane of the bottom 101 of the vessel 100.

To assist in detaching and reattaching the handle 200, the cookware vessel 1000 includes a bracket 120 positioned on the sidewall 102 in a location below the rim 104. When the sidewall 102 is sloped, the bracket 120 may be disposed well below the rim 104 to avoid increasing the width needed for packing and storage. In other examples, the bracket 120 may extend laterally beyond (e.g., above) the perimeter of the rim 104. The bracket 120 may be integrated with or positioned on an external side of a flange 115 (shown in FIG. 1B) that is connected (e.g., directly connected) to the sidewall 102 of the vessel 100, such as with bolts, welds, rivets, and/or any other connector. The handle 200 may be detached from and re-attached to the bracket 120. Further details regarding examples of the bracket 120 are discussed below.

To further assist in detaching and re-attaching the handle 200, the handle 200 may include a U-shaped coupling 210 (shown in FIG. 2C) that is connected at its distal end to an elongated plate 220. The distal end refers to the end that is further away (i.e., distal) from the vessel 100 (e.g., the end that is positioned to the right in the figures), while the proximal end refers to the end that is closer (i.e., proximal) to the vessel 100 (e.g., the end that is positioned to the left in the figures). The elongated plate 220 in turn extends into a grip portion 230 of the handle 200. At least a portion of the U-shaped coupling 210 is configured to readily engage and disengage from the bracket 120. In some examples, the coupling 210 is not limited strictly to a U-shape. In one or more of such examples, the outer vertical plate 214 (that enters the cavity 120*c* in the bracket 120) can have a different configuration with respect to the grip 230 of the handle 200.

In some examples, the U-shaped coupling 210 (and the functional equivalent in other examples) is configured to be securely engaged within the bracket 120 by an actuator 260 in the handle 200. This structure may eliminate the potential gaps between components that leads to the undesirable "play" in traditional systems.

Furthermore, cookware vessel 1000 may provide an easier and more reliable means for attachment to the bracket 120 of the cookware vessel 100. For example, in operation, a user of cookware vessel 100 only utilizes the actuator 260 to remove the handle 200 from the vessel 100, not to attach the removed handle 200 to the vessel 100. In contrast to this, in traditional detachable handles, the user is required to manually engage an actuator to attach the handle to the cookware vessel. As such, these traditional detachable handles are more complicated, and require a user to simultaneously perform multiple functions in order to re-attach the detachable handle.

As another example, the cookware vessel 1000 of FIGS. 1A-8B may further assist the user in re-attaching the handle 200 (in contrast to traditional handles). As such, re-attachment of the handle 200 may not need to be fully completed by a user. As an example of this, the cookware vessel 1000 may include a spring driven actuation mechanism that urges a rod of the handle 200 forward, and further urges the handle 200 to completely enter and engage the bracket 120 in a latched state. This results in a fully re-attached handle 200, in some examples. Furthermore, to remove the handle 200, the user can simple engage the actuator 260 and pull the handle 200 away from the vessel 100, thereby removing the handle 200 from the latched state.

As is discussed above, the cookware vessel 1000 includes a bracket 120 positioned on the sidewall 102 of the vessel 100. In the example illustrated in FIGS. 1C-1D, the bracket 120 includes a cavity 120*c* (shown in FIG. 1C). The cavity 120*c* has a lower opening 120 that may generally extend forward from a rear of the bracket 120 closest the sidewall 102 (e.g., the left-side of FIG. 1D) to the bottom of a generally vertical front face 121 of the bracket 120. The front face 121 includes an aperture 122 positioned in a location above the lower opening 120*o*. The aperture 122 essentially subdivides the front face 121 of the bracket 120 into a lower segment 1211s that extends from the lower edge 1211 of the front face 121 to a bottom edge 1212 of the aperture 122, and an upper segment 121 is positioned above the aperture 122. In operation, the aperture 122 receives and supports the elongated rod 240 of the handle 200 (discussed below) when the handle 200 is attached to the bracket 120.

The adjacent faces of the bracket 120 that surround cavity 120c are defined by opposite facing sidewalls 123 and 124 (shown in FIG. 1C), each being separated from the other by the medially disposed front face 121 of the bracket 120. All three of the faces or sidewalls 121, 123, and 124 of the bracket 120 preferably slope inward from the opening 120o, so as to provide a wedge shaped cavity 120c for receiving one or more complimentary portions of the handle 200. For example, a portion of the U-shaped coupling 210 (shown in FIG. 2C) is shaped and/or sized (or configured in any other manner) to enter the cavity 120c when the handle 200 is attached to the bracket 120. The interior sidewalls of the cavity 120c may be curvilinear, planar, or any combination of curvilinear shapes.

Figure 2A:
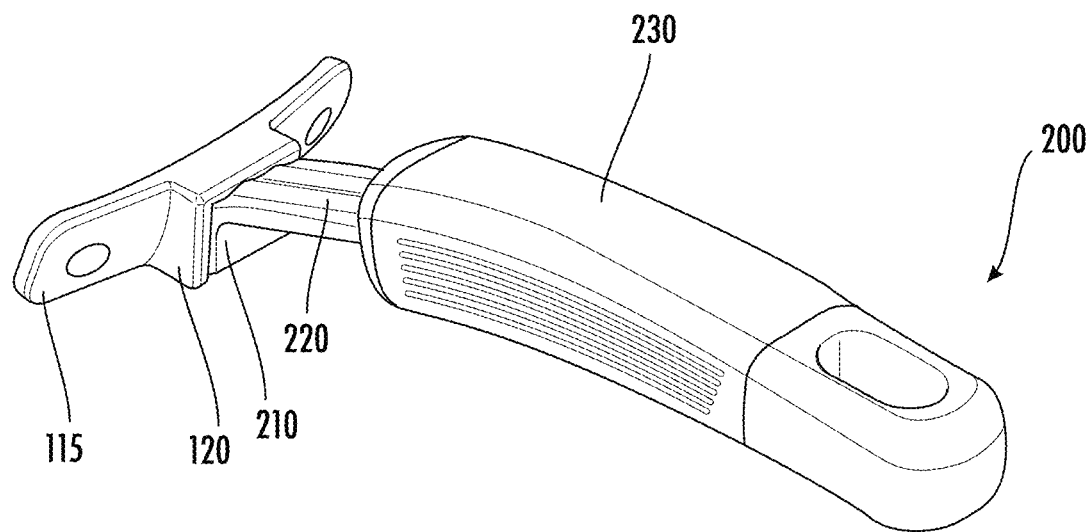
FIG. 2A is a perspective view of the handle attached to the flange of the cookware vessel via the bracket.
Figure 2B:
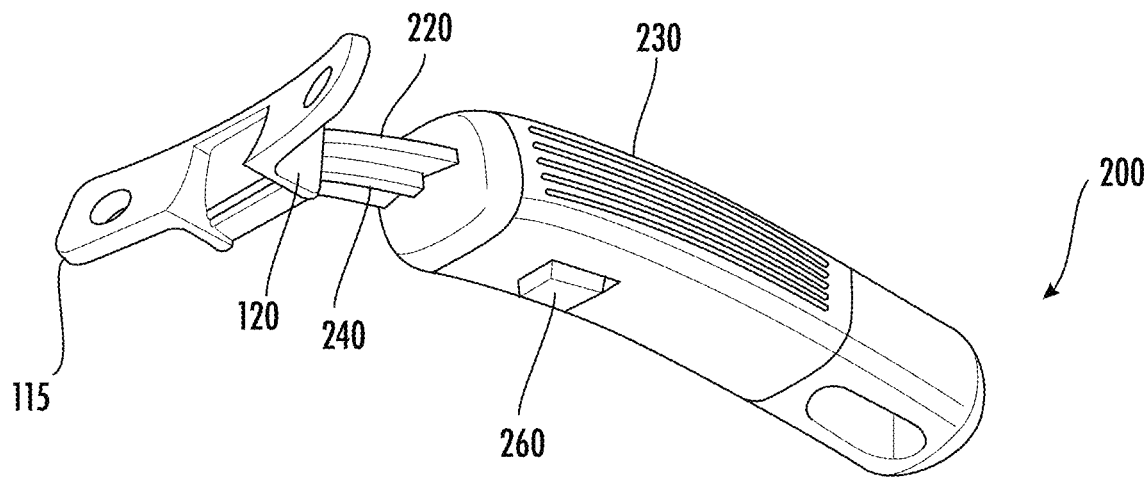
FIG. 2B is another perspective view corresponding to a position inside and below the cookware vessel, illustrating the position of the bracket as being integral with the flange.
Figure 2C:
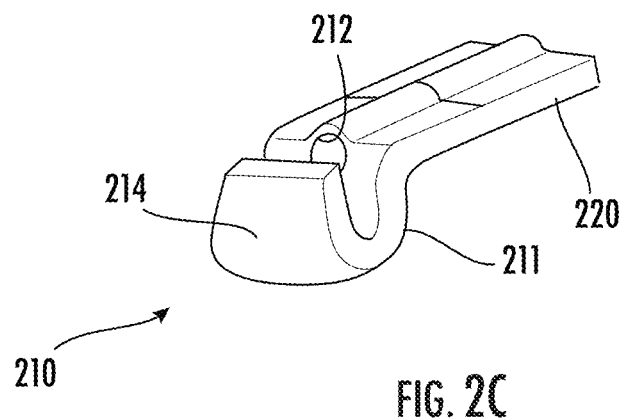
FIG. 2C is a perspective view of a portion of the handle that engages the bracket to secure the handle to the cookware vessel via the flange and the bracket portion thereof.

In the example illustrated in FIG. 2C, the U-shaped coupling 210 includes an outer vertical plate 214 and an inner vertical plate 211 that are joined together at a lower portion, so as to define the U-shape of the U-shaped coupling 210. This joining may create a sideways "C" shape, and may define a channel in the U-shaped coupling 210, as is illustrated. The outer vertical plate 214 of the U-shaped coupling 210 may be shaped and/or sized to be fully received within the cavity 120c of the bracket 120, when the handle 200 is attached to the vessel 100. The outer vertical plate 214 of the U-shaped coupling 210 preferably has a wedge-like shape, such as the same wedge-like shape of the cavity 120c of the bracket 120c, in some examples.

In the example illustrated in FIGS. 3A-3D, the handle 200 includes an elongated rod 240, a spring 250, and an actuator 260 that may assist in attaching and detaching the handle 200 to the vessel 100.

The elongated rod 240 refers to a moveable structure that can move back and forth in relation to the handle 200 so that a beveled tip 240t of the elongated rod 240 can extend into (and retract out of) the aperture 122 of the bracket 120. When extended into the aperture 122, the elongated rod 240 may assist in securing the handle 200 to the vessel 100. Furthermore, when the elongated rod 240 is retracted out of the aperture 122, the handle 200 may be detached from the vessel 100 (e.g., by pulling downward on the handle 200). When the elongated rod 240 is moved forward (so as to extend into the aperture 122), the beveled tip 240t may extend out of an aperture 212 in the U-shaped coupling 210 (shown in FIG. 2C). When the elongated rod 240 is moved backward (so as to retract out of the aperture 122), the beveled tip 240t may retract back into the aperture 212 in the U-shaped coupling.

Figure 3A:
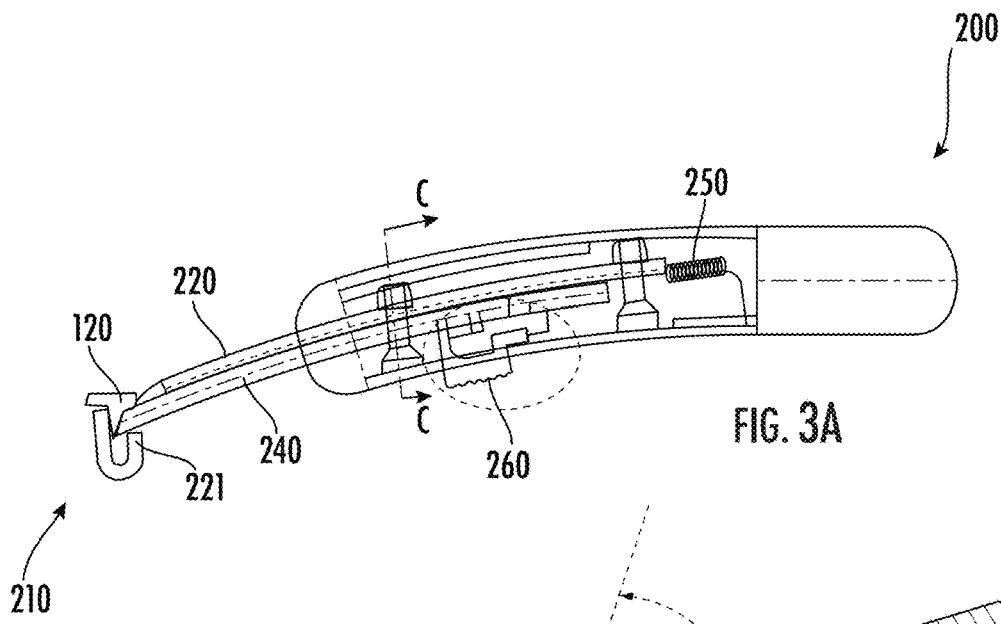
FIG. 3A is a side elevation sectional view of the bracket and handle.
Figure 3B:
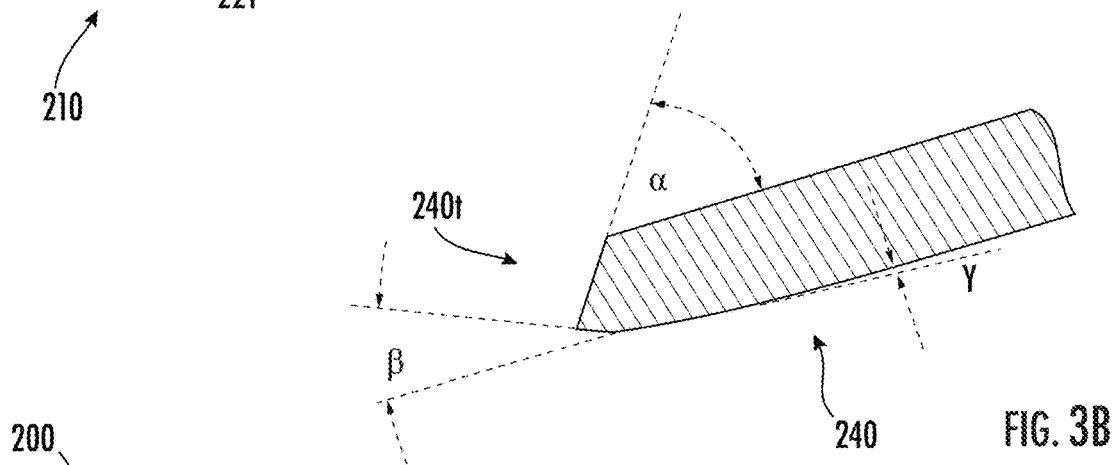
FIG. 3B is an expanded side elevation view of FIG. 3A, illustrating a preferred example of the configuration of the tip of the elongated rod.
Figure 3C:
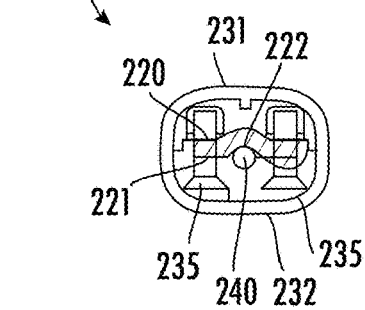
FIG. 3C is a cross-sectional elevation view of a portion of the handle taken at section line C-C in FIG. 3A.

The elongated rod 240 may be disposed to translate along a concave depression 222 in the lower surface 221 of the elongated plate 220 of the handle 220, as is illustrated in FIG. 3C (which illustrates the elongated plate 220 and the elongated rod 240 in a sectional view that is perpendicular to the principal elongated axis of each member of the handle 200). A portion of the elongated plate 220 may be held between an upper shell 231 and lower shell 232 of the grip portion 230. Screws may secure the upper and lower shells 231 and 232 together. The lower shell 232 may urge the elongated rod 240 towards the concave depression 222, which may keep the elongated rod 240 in contact with the concave depression 222.

The beveled tip 240t of the elongated rod 240 is preferably configured with three facets, in some examples. An example of these three facets is illustrated in FIGS. 4A and 4B, as upper facet 241, intermediate facet 242, and lower facet 243. Upper facet 241 extends from an upper surface of the elongated rod 240 beyond the centerline thereof, and disposed with respect to the upper surface of the elongated rod 240 at an angle $\alpha$. The angle $\alpha$ ranges from about (i.e., +/−5 degrees) 20 degrees to about 60 degrees, and preferably from about 25 degrees to about 55 degrees, and more preferably about 40 degrees to about 50 degrees, in some examples. Intermediate facet 242 extends from an intersection with the upper facet 241 to near the lower surface of the elongated rod 240, being disposed at an angle $\beta$ that is defined with respect to a base that is coplanar with the lower facet 243. The angle $\beta$ ranges from about 10 degrees to about 40 degrees, and preferably from about 15 degrees to about 35 degrees, and more preferably from about 18 degrees to about 30 degrees, in some examples. The lower facet 243 is disposed at an angle $\gamma$ with respect to the lower surface of the elongated rod 240, where angle $\gamma$ ranges from about 0 degrees to about 15 degrees, and preferably from about 1 degree to about 10 degrees, and more preferably about 1 degree to about 5 degrees, in some examples. The facets 241, 242, and 243 preferably intersect to define 2 parallel linear edges, which are generally disposed parallel to the bottom of the bracket 120, as illustrated in FIG. 4B.

In some examples, the elongated rod 240 may be tilted at an acute angle $\theta$ with respect to the horizontal plane of the bottom 101 of the vessel 100, as is illustrated in FIG. 4C. In such an example, when angle $\theta$ is from about 5 degrees to about 25 degrees, angle $\alpha$, angle $\beta$, and angle $\gamma$ are mostly preferably about 45 degrees, about 20 degrees, and about 3 degrees, respectively. An upper portion of the elongated rod 240 adjacent the tip 240t may act as the upper facet 241 when it encounters the lower edge 1211 of the bracket 120. In some examples, the beveled tip 240t preferably has 3 facets disposed at optimum angles. The beveled top 240t may also have an obtuse angle $\omega$ between the lower facet 241 and the intermediate facet 242.

In some examples, the sloping of the facets 241, 242, and 243 of the beveled tip 240t allows for tolerance variations in the aperture 212 and/or aperture 122. Furthermore, use of the concave depression 222 to guide the elongated rod 240 to the aperture 122 of the bracket 120 may also help eliminate potential "play", in some examples, as the spring 250 acts (via the elongated rod 240) to complete the contact of the outer vertical plate 214 within the complementary cavity 120c of the bracket 120. Others examples of the function and benefits of the shape of the beveled tip 240t (which may be defined by facets 241, 242 and 243) is discussed below with regard to FIGS. 7A-8B.

While the elongated rod 240 is illustrated as having a cross-sectional area that is circular, it can have alternate shapes, such as being square, elliptical, rectangular, any other shape that allows the beveled tip 240t to be inserted into the aperture 122 (e.g., a channel shape), or any combination of the preceding. In some examples, alternative non-circular shapes of the elongated rod 240 do not preclude the tip 240t from presenting two or more facets at a preferred range of angles to provide a secure and "play" free coupling of the handle 200 to the vessel 100. Furthermore, the elongated rod 240 can have other shapes that also urge a wedge-shaped portion into a bracket 120, such as a channel shape. Also, the elongated rod 240 may be straight or curvilinear.

In some examples, a front facet of the elongated rod 240 (or any other portion of the handle 200 that engages the face 121 of the bracket 120) preferably has a complementary tapering shape to the exterior of the face 121 of the bracket 120. In some examples, inner and outer faces of the bracket 120 may have complimentary inward or outward tapers to fully mate on a different set of two or more spaced apart faces of the U-shaped coupling 210 (or any other equivalent coupling structure of the handle 200).

As is discussed above, the handle 200 further includes the spring 250 and the actuator 260. The spring 250 refers to a structure or device that resiliently applies force to the elongated rod 240. The spring 250 may apply force to a distal end of the elongated rod 240, causing the beveled tip 240t to extend towards the bracket 120. This may allow the elongated rod 240 to be locked in place (at least temporarily), when the beveled tip 240t has extended into the aperture 122 in the bracket 120. Although the spring 250 is illustrated as applying force to the elongated rod 240, in other examples, it may apply force to the actuator 260 directly, rather than the elongated rod 240.

The actuator 260 refers to a structure or device that can apply an opposing force to the elongated rod 240, so as to temporarily retract the beveled tip 240t out of the aperture 122 in the bracket 120. When activated (or otherwise in use), the actuator 260 may apply force to the elongated rod 240, causing the elongated rod 240 to push back against the force of the spring 250. This may compress the spring 250, causing the beveled tip 240t to retract out of aperture 122 in the bracket 120. When de-activated (or released, or otherwise not in use), the actuator 260 may no longer apply force to the elongated rod 240, causing the spring 250 to once again move the beveled tip 240t towards the bracket 120 (or otherwise extend the beveled tip 240t away from the grip 230 of the handle 200).

Figure 3D:
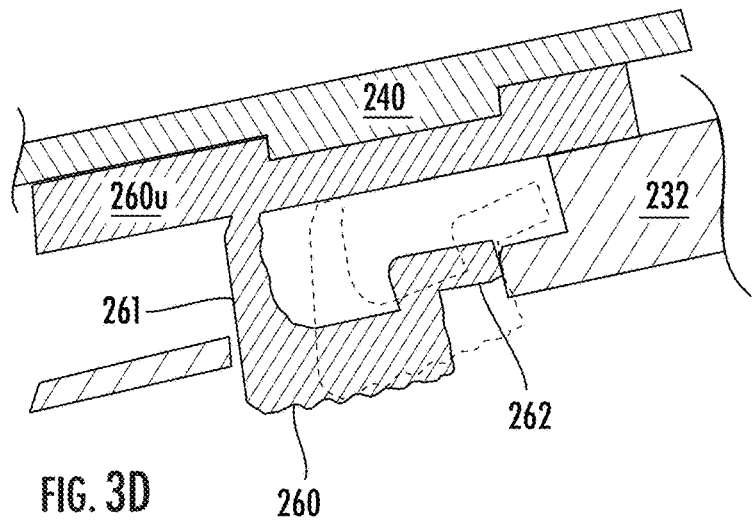
FIG. 3D is an expanded view of the portion of the handle within the ellipse region defined by the broken line boundary in FIG. 3A, showing the actuator in alternative positions.
Figure 5A:
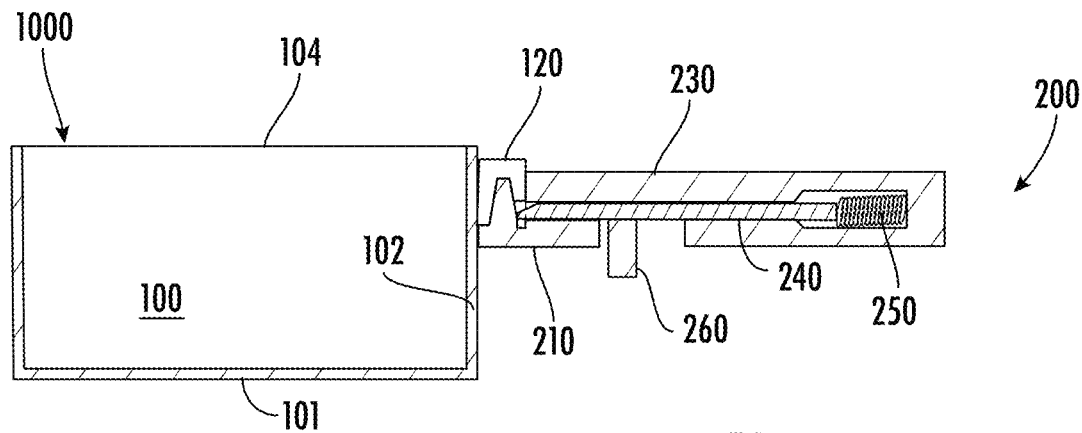
FIG. 5A is a side cross-sectional elevation view of another example cookware vessel engaged to another example removable cookware handle.
Figure 5B:
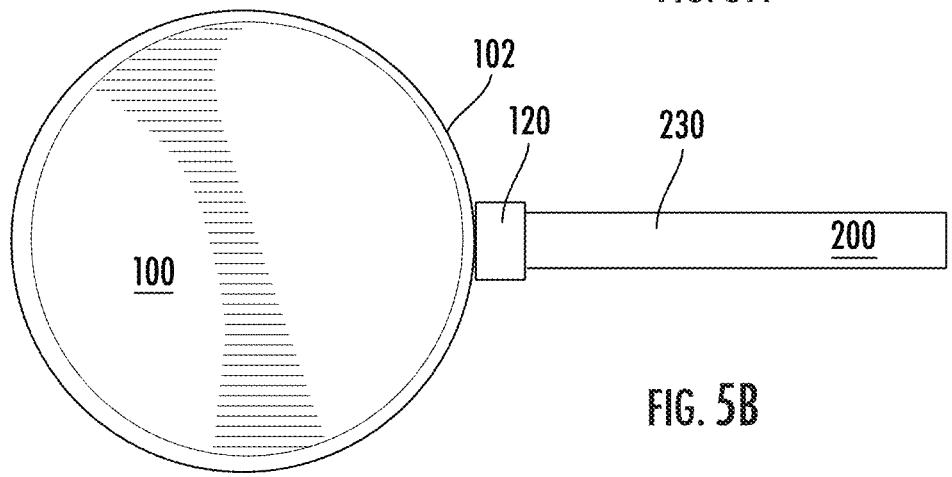
FIG. 5B is a top plan view of the cookware vessel and cookware handle of FIG. 5A.
Figure 5C:
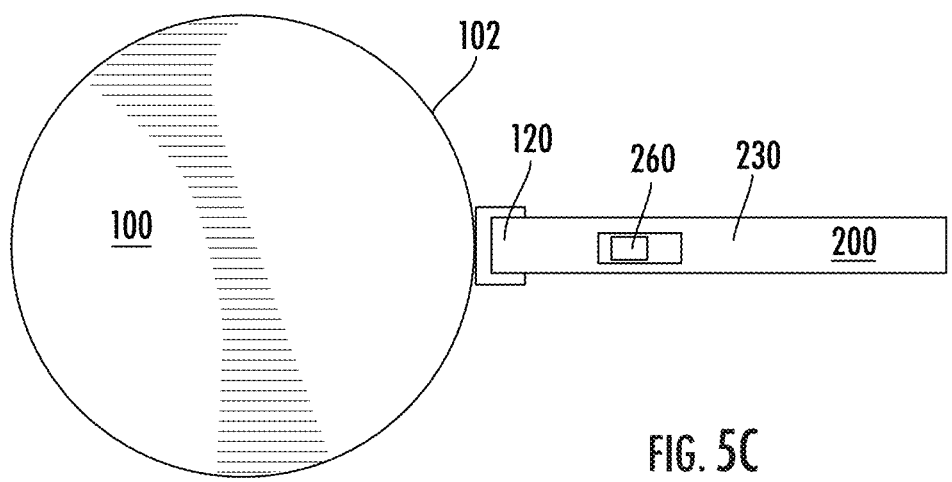
FIG. 5C is a bottom plan view of the cookware vessel and cookware handle of FIG. 5A.

The actuator 260 may have any size, shape, and/or positioning that allows it to apply an opposing force to the elongated rod 240. In the example illustrated in FIGS. 2B and 3A, the actuator 260 has a button-like shape, and it is positioned on the bottom of the grip 230. In the example illustrated in FIGS. 5A-5C, the actuator 260 is shaped as a downward extending trigger, and it is also positioned on the bottom of the grip 230. In other examples, the actuator 260 can also be optionally positioned on the top or sides of the grip 230. In some examples, the actuator 260 may include a portion 261 that is able to flex to allow a rear stop portion 262 to extend upward over a portion of the lower shell 232, an example of which is illustrated in FIG. 3D. This flex allows the portion 261 to move upwards into a cavity in the lower shell 232, so as to allow the actuator 260 to be moved further backwards. As is further illustrated in FIG. 3D, the actuator 260 further includes an upper portion 260u that is connected (via two mating components) to the elongated rod 240, allowing the actuator 260 to apply the opposing force to the elongated rod 240.

Figure 6A:
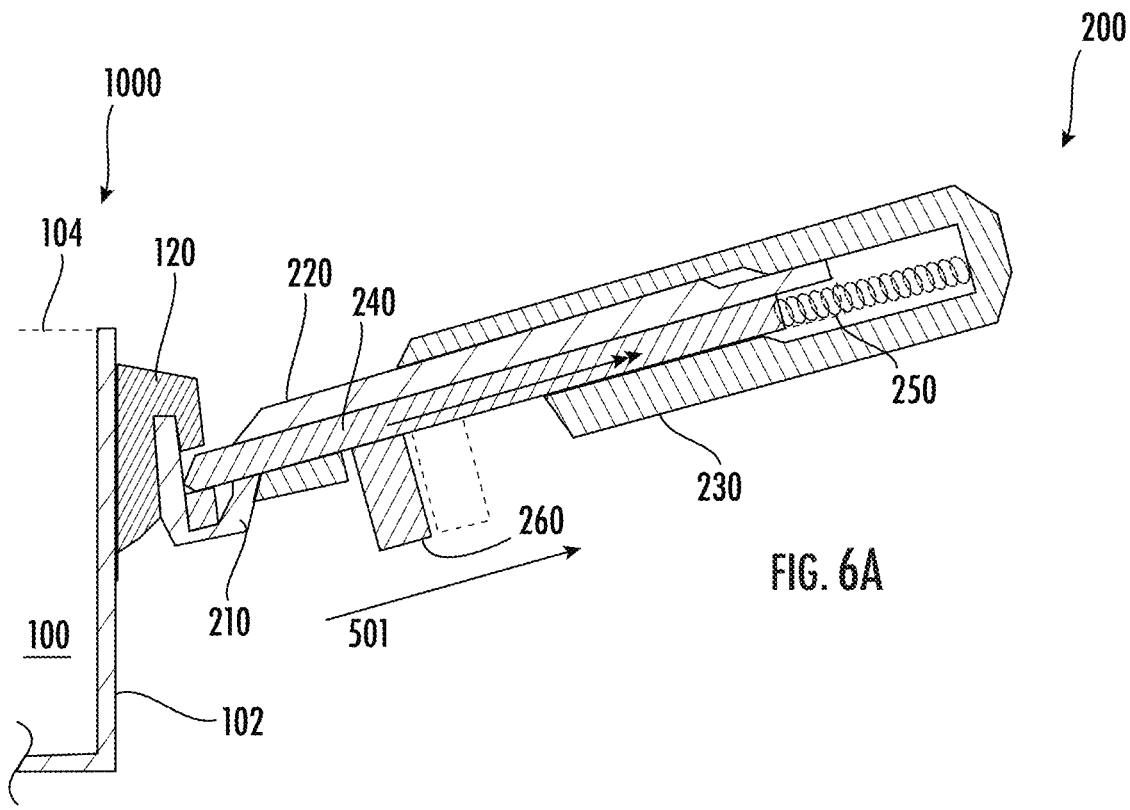
FIGS. 6A-8B illustrate, in schematic cross-sectional elevation views, an example sequence of steps for removing and then re-engaging a cookware handle with a bracket on a sidewall of a cookware vessel.
Figure 6B:
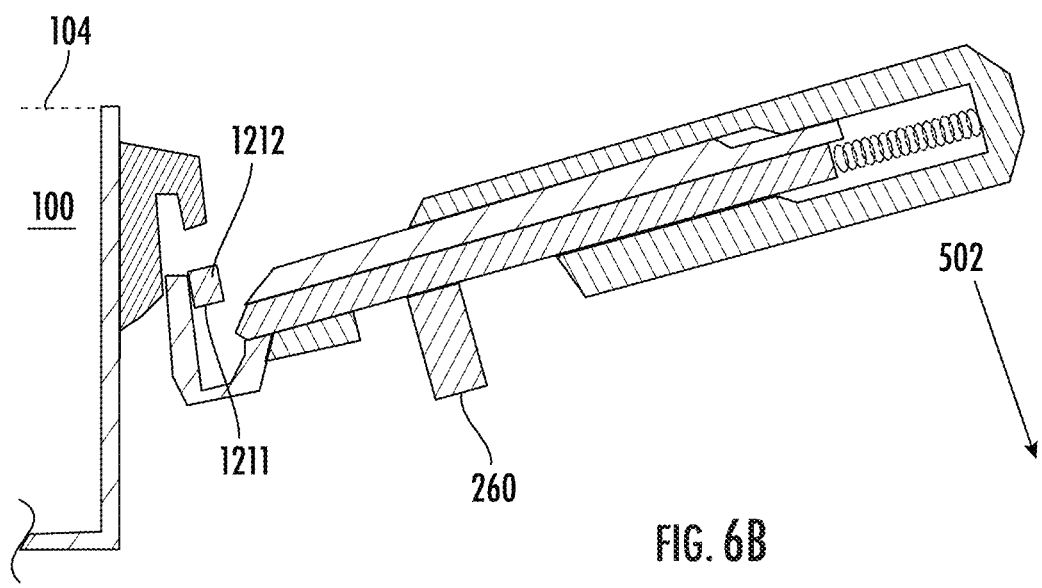

FIG. 6A-6B illustrate example steps for the removal of the handle 200 from the vessel 100. FIG. 6A schematically shows movement of the actuator 260 used to disengage the handle 200 so it can be removed from the vessel 100 as shown in FIG. 6B by a downward movement of the grip portion 230.

As shown in FIG. 6A, the actuator 260 is moved backwards (in the direction of arrow 501) by the user. This movement removes the tip 240t of the elongated rod 240 from the aperture 122 in the bracket 120. Then, as is illustrated in FIG. 6B, the handle 200 can be lowered by the user in the direction of arrow 502, so that the U-shaped coupling 210 is removed from the bracket 120. This detaches the handle 200 from the vessel 100.

Figure 7A:
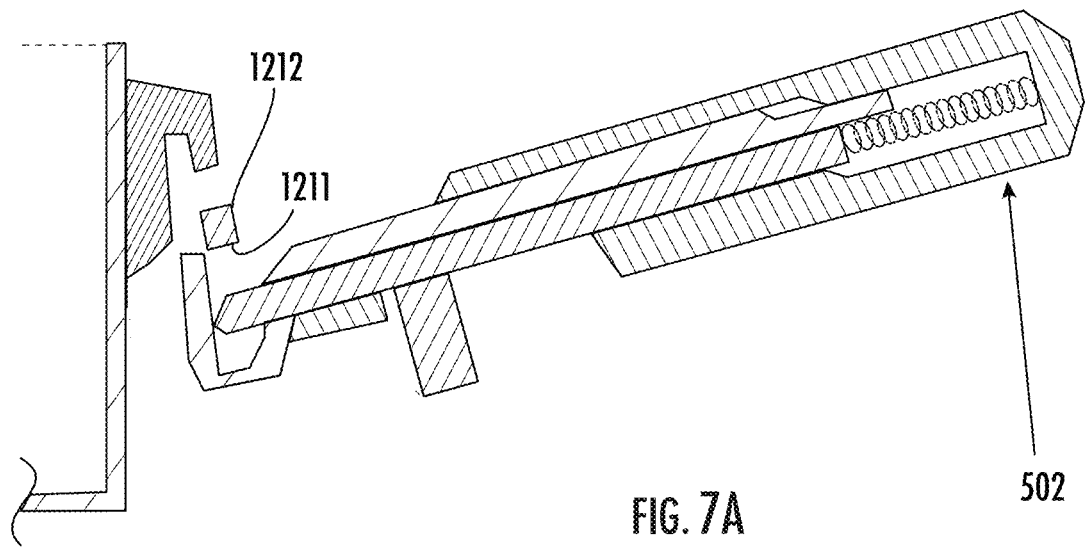
Figure 7B:
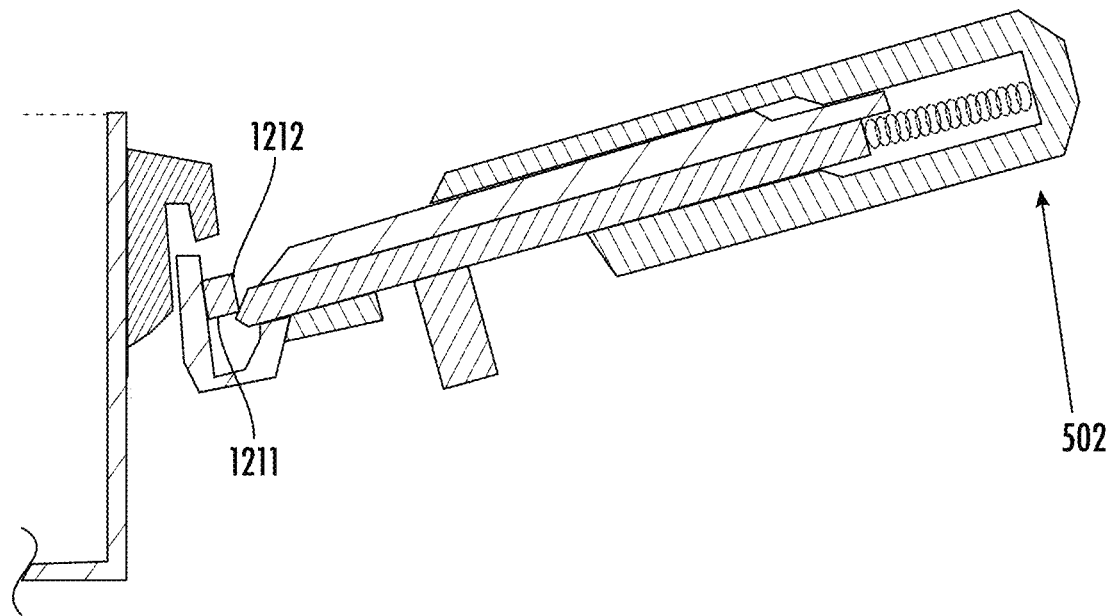
Figure 8A:
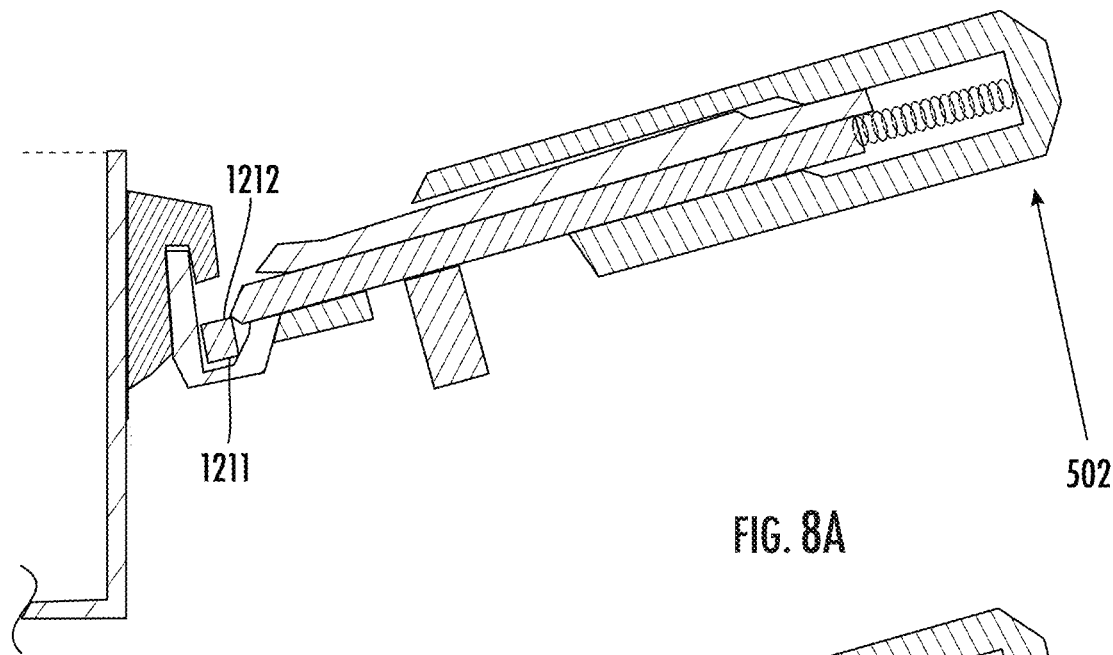
Figure 8B:
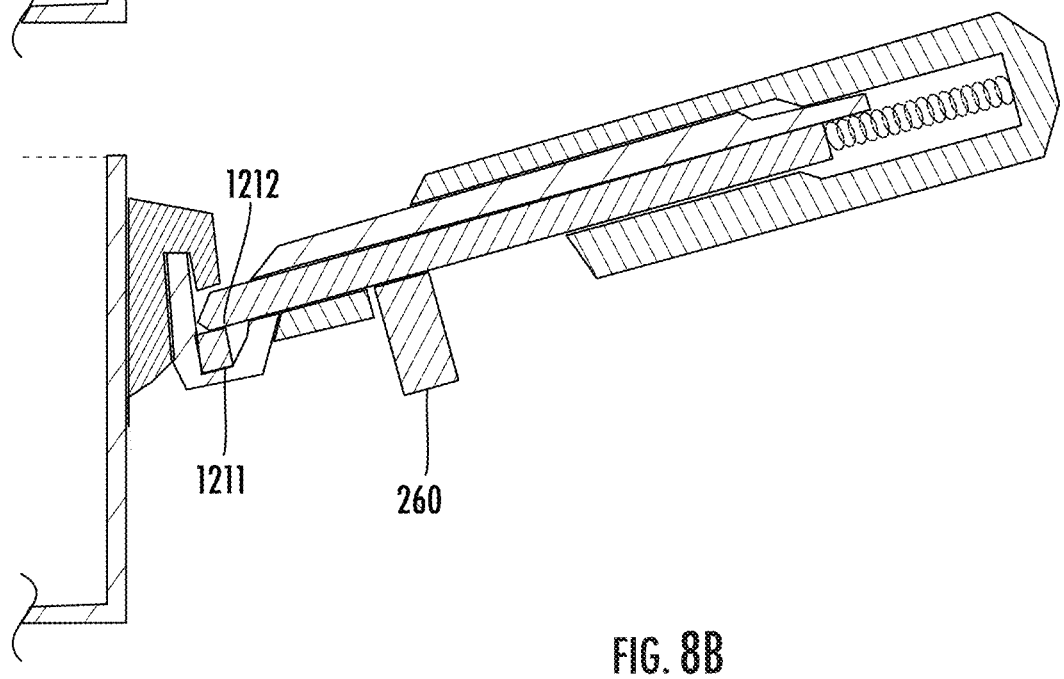

FIGS. 7A-8B illustrate example steps for the attachment of the handle 200 to the vessel 100. FIG. 7A schematically shows the handle 200 being positioned for reattachment to the bracket 120 of the vessel 100 by insertion of a portion therein. FIG. 7B shows the handle 200 first engaging the bracket 120 and the movement of the elongated rod 240 as the handle 200 is raised. FIG. 8A shows the subsequent progress in the handle 200 engaging the bracket 120 as the elongated rod 240 starts to advance into the aperture 122 in the bracket 120. FIG. 8B shows the position of the handle components prior to being completely engaged with the bracket 120.

As is shown in FIGS. 7A-7B, the user positions the outer vertical plate 214 of the handle 200 below the bracket 120, and more specifically below the opening 120o of the bracket 120. The user may then perform an upward movement of the handle 200 (in the direction of arrow 502) so as to insert the outer vertical plate 214 (or another equivalent structure of the handle 200) into the cavity 120c of the bracket 120.

On inserting the outer vertical plate 214 into the cavity 120c, the lower edge 1211 and the bottom edge 1212 of the bracket 120 encounter (or otherwise touch) the beveled tip 240t of the elongated rod 240 in that order before the elongated rod 240 can fully advance into the aperture 122 in the bracket 120. This is seen in FIGS. 7B and 8B.

As the user lifts the handle 200, the upper facet 241 encounters the lower edge 1211 on the bracket 120, as is seen in FIG. 7B. The angle of the facet 241 may displace some of the upward force laterally against the elongated rod 240, causing the elongated rod 240 to move backwards against the spring 250 (compressing it). Then, when the handle 200 is raised further, the intermediate facet 242 encounters the bottom edge 1212, which permits the compressed spring 250 to advance the elongated rod 240 forward towards the bracket 120. This is shown in FIG. 8A. This movement of the elongated rod 240 forward may urge the handle 200 upward as the lower facet 243 then encounters the bottom edge 1212. As such, if the handle 200 was prematurely released by the user before the outer vertical plate 214 fully enters the cavity 120c, the upward movement (caused by lower facet 243) may continue to push the handle 200 upwards, allowing the outer vertical plate 214 to fully enter the cavity 120c of the bracket 120. This attaches the handle 200 to the vessel 100, as is seen in FIG. 8B. It also may eliminate a potential for "play" in the connection or coupling with the handle 200 to the bracket 120, in some examples. Furthermore, the attachment of the handle 200 does not require activation of the actuator 260 by the user.

In some examples, the function of the spring 250 is not merely to urge the beveled tip 240t into the aperture 122 in the bracket 120, but also to cause the beveled tip 240t to act on the lower edge 1212 of the aperture 122 to urge the outer vertical plate 214 (or its equivalent) completely upward into the cavity 120c (with the weight of the vessel 100 and its contents applying an opposing force). This may allow the handle 200 to fully attach to the vessel 100 even when the user is no longer moving the handle 200 upward. In some examples, the placement of the edge between facets 241 and 242 below the center line of the rod 240 allows the elongated rod 240 to start to act via the spring 250 to urge the handle 200 upward even when a user releases the handle grip 230 so that the handle 200 will then self-latch with the bracket 120. The user need not use (or remember to use) the actuator 260 to latch the handle 200 to the vessel 100.

Figure 9A:
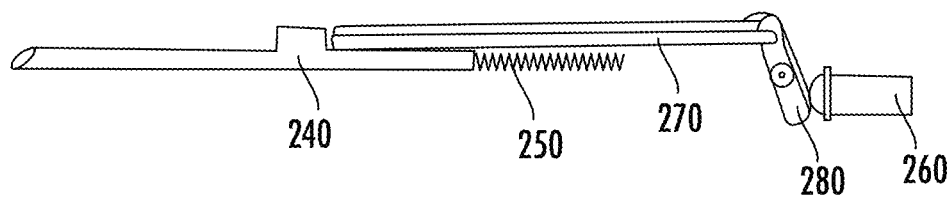
FIGS. 9A-9C illustrate another example of a handle that may be detached and re-attached to the vessel.
Figure 9B:
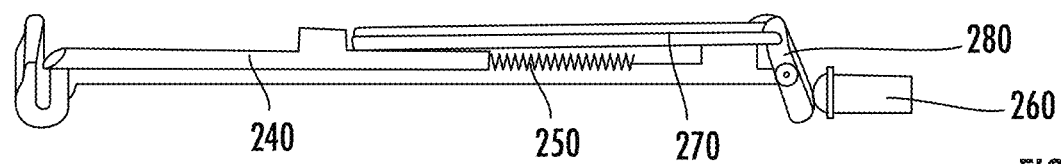
Figure 9C:
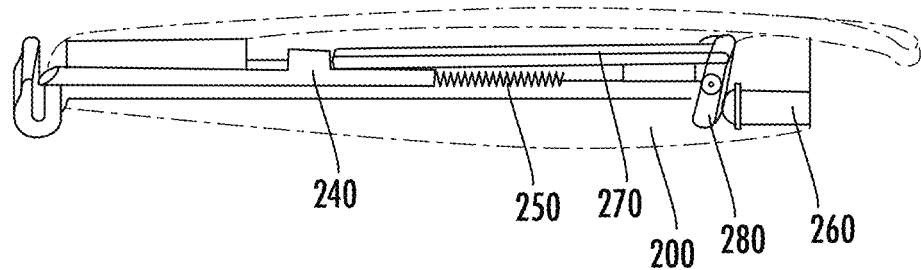

FIGS. 9A-9C illustrate another example of a handle 200 that may be detached and re-attached to the vessel 100. In the example illustrated in FIGS. 9A-9C, the actuator 260 is a laterally pushable knob (or other pushable structure) that is positioned at a distal end of grip 230 of the handle 200. When not being pushed by a user, the actuator 260 may extend out of the distal end of the grip 230 of the handle 200. Alternatively, when pushed by a user, the actuator 260 may move laterally into a cavity in the distal end of the grip 230 of the handle 200.

In the illustrated example, the handle 200 further includes a rocker arm 280, a pulling arm 270, and the elongated rod 240. The actuator 260 is coupled to the rocker arm 280. The rocker arm 280 is coupled to the pulling arm 270. The pulling arm 270 is coupled to the elongated rod 240. In an example of operation, when the user pushes actuator 260 (e.g., pushes the actuator 260 towards the left side of FIGS. 9A-9C), the rocker arm 280 rotates (e.g., clockwise in FIGS. 9A-9C) around a swivel point. This pulls the pulling arm 270 backwards (e.g., towards the right side of FIGS. 9A-9C), which also pulls the elongated rod 240 backwards (e.g., towards the right side of FIGS. 9A-9C). As is discussed above, the movement may withdraw the beveled tip 240t from the aperture 122 of the bracket 120 (and it may also compress the spring 250). The handle 200 can then be removed from the bracket 120 by moving the handle 200 downwards in relation to the vessel 100, causing the outer vertical plate 214 of the U-shaped coupling 210 to be removed from the cavity 120c of the bracket 120.

Although the spring 250 is illustrated as being fixed in a cavity that is positioned to the right and above the rod 240, the spring 250 may be positioned in a different location. Furthermore, the spring 250 may be replaced with a torsion spring at the rocker arm 280, in some examples.

Figure 10A:
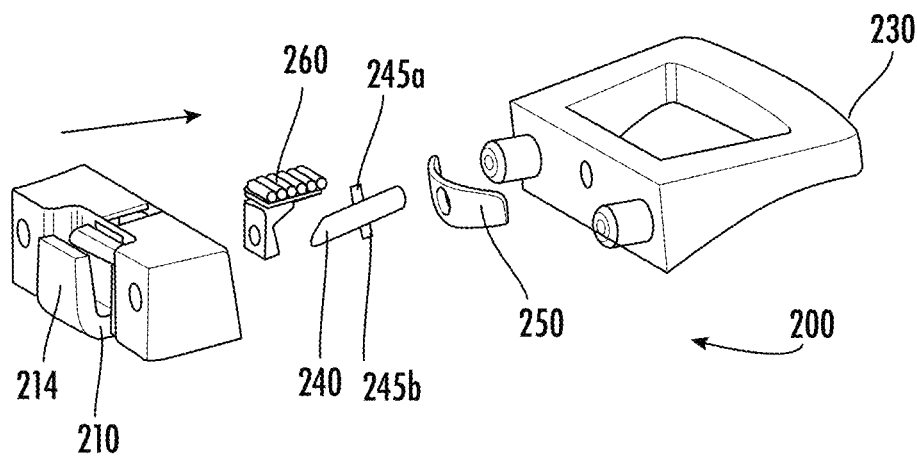
FIGS. 10A-10B illustrate a further example of a handle that may be detached and re-attached to the vessel.
Figure 10B:
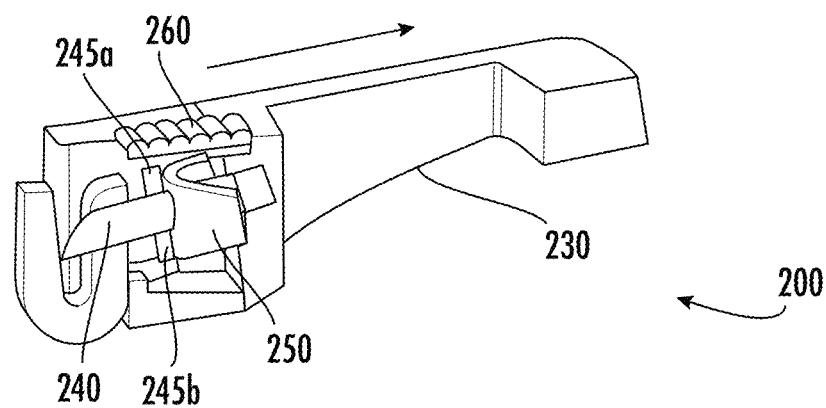

FIGS. 10A-10B illustrate a further example of a handle 200 that may be detached and re-attached to the vessel 100. FIG. 10A is a exploded view of the handle 200, and FIG. 10B is a half section perspective view along a symmetric axis of the handle 200. The vessel 100, flange 115, and bracket 120 are not illustrated in FIGS. 10A-10B.

Handle 200 is preferably a shorter or helper handle for cookware, in some examples. To assist in providing a shorter handle, the rod 240 may be shortened (in comparison to the elongated rod 200 discussed above). To further assist in providing a shorter handle, the spring 250 may be a leaf spring, a flat spring, or a plate spring (as opposed to the coiled linear spring discussed above as an example of spring 250 in FIGS. 1A-9C). In the example illustrated in FIGS. 10A-10B, the spring 250 is a plate spring that is folded into a v shape with a flat center.

Furthermore, the actuator 260 may be positioned on a top portion of the grip 230 at a location adjacent the proximal end of the grip 230 of the handle 200. The actuator 260 may be moved (by the user) linearly in a slot or track included in the handle 200.

The rod 240 of the handle 200 may also include one or more stops 245 (e.g., two stops 245a and 245b) that project orthogonally from the rod 240. The spring 250 may apply force to the distal portion of the stop(s) 245 (i.e., the right side portion of the stops 245 in FIGS. 10A-10B), so as to urge the rod 240 forward (i.e., to left side in FIGS. 10A-10B). To assist with this, the spring 250 may include an aperture through which the rod 240 may be inserted, as is illustrated. This may allow the front side of the spring 250 to press directly against the distal portion of the stop(s) 245. Additionally, the actuator 260 may apply an opposing force to the proximal portion of the stop(s) 245 (i.e., the left side portion of the stops 245 in FIGS. 10A-10B), so as to urge the rod 240 backwards (i.e., to right side in FIGS. 10A-10B). To assist with this, the actuator 260 may also include an aperture through which the rod 240 may be inserted, as is illustrated. This may allow the back side of the actuator 260 to press directly against the proximal portion of the stop(s) 245.

In an example of operation, the user may push the actuator 260 backwards in a track, as is illustrated by the arrow included in FIGS. 10A-10B. This may cause the actuator 260 to apply force to the proximal portion of the stop(s) 245, which may move the rod 240 backwards (i.e., to right side in FIGS. 10A-10B). As is discussed above, the movement may withdraw the beveled tip 240t from the aperture 122 of the bracket 120 (and it may also compress the spring 250). The handle 200 can then be removed from the bracket 120 by moving the handle 200 downwards in relation to the vessel 100, causing the outer vertical plate 214 of the U-shaped coupling 210 to be removed from the cavity 120c of the bracket 120. When the user stops pushing on the actuator 260, the compressed spring 250 may move the rod 240 forward again (i.e., to the left side in FIGS. 10-10B).

Figure 11A:
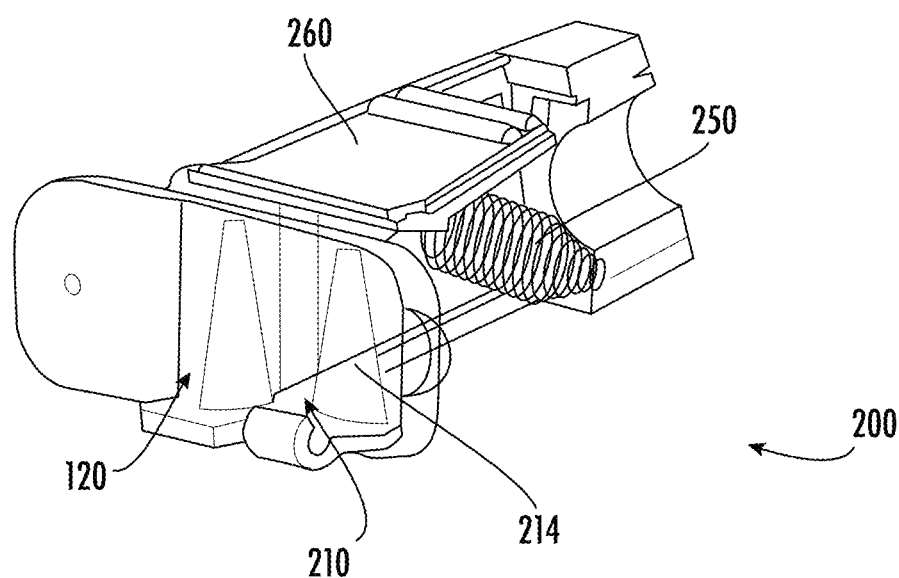
FIGS. 11A-11E illustrate a further example of a handle that may be detached and re-attached to the vessel, and also illustrate another example of a bracket that may be used to detach and re-attach the handle to the vessel.
Figure 11B:
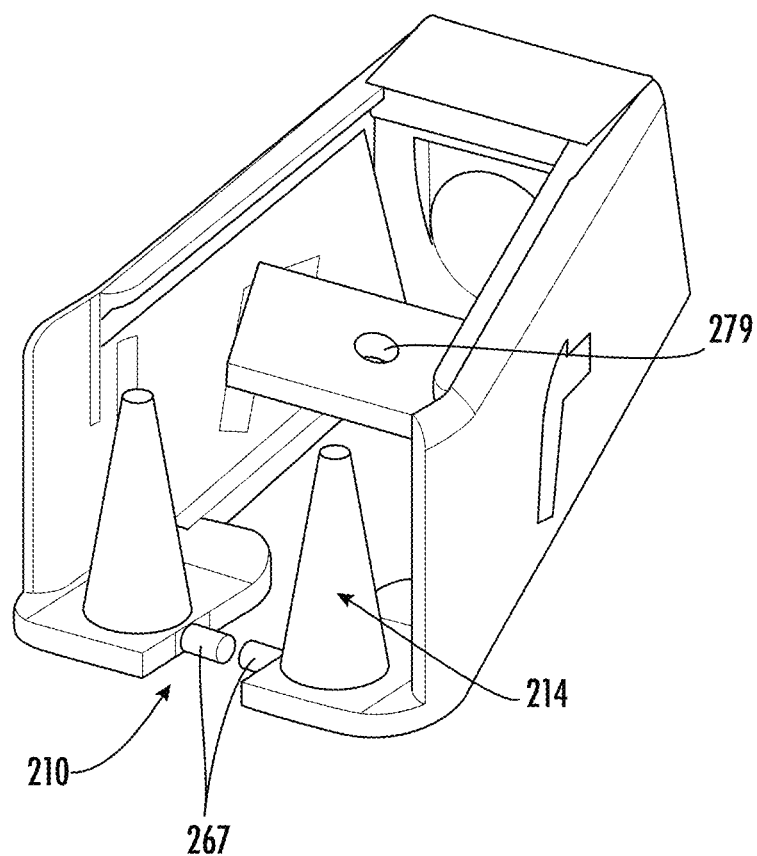
Figure 11C:
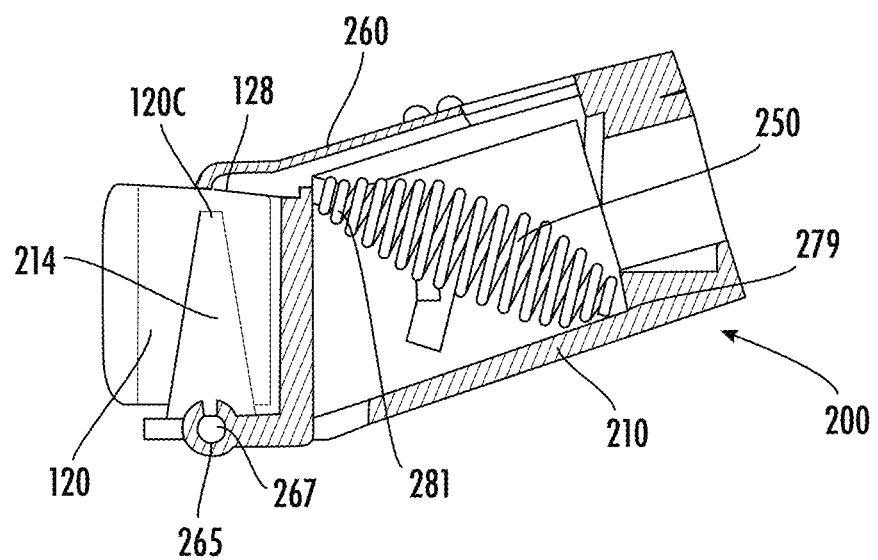
Figure 11D:
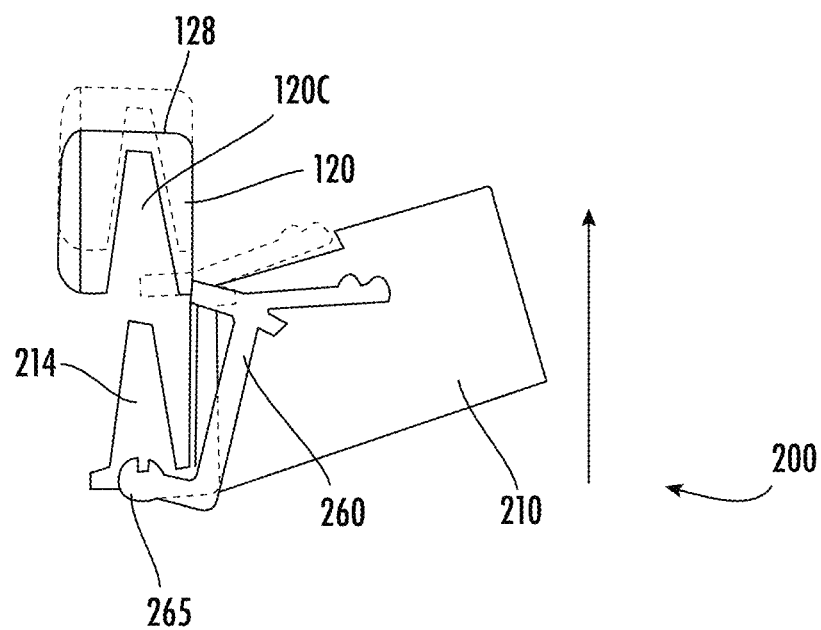
Figure 11E:
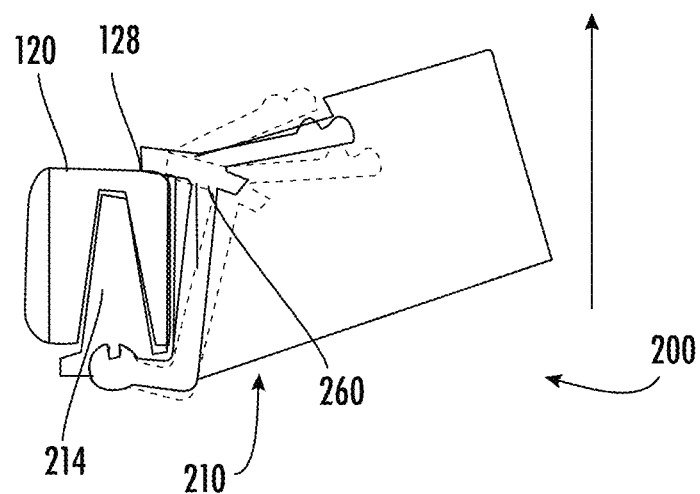

FIGS. 11A-11E illustrate a further example of a handle 200 that may be detached and re-attached to the vessel 100, and also illustrate another example of a bracket 120 that may be used to detach and re-attach the handle 200 to the vessel 100. FIG. 11A is a semi-transparent perspective view of the handle 200 attached to the bracket 120 (with the vessel 100 not illustrated). FIG. 11B is a perspective view of a coupling 210 of the handle 200. FIG. 11C is a side cross-sectional view of the handle 200 attached to the bracket 120. FIGS. 11D-11E are side cross-sectional views showing an example sequence of steps for attaching the handle 200 to the bracket 120 of the vessel 100.

In the example illustrated in FIGS. 11A-11E, the handle 200 does not include the elongated rod 240. Instead, the actuator 260 of the handle 200 can engage (e.g., clip into, clamp onto) a portion of the bracket 120. This may assist in securing the handle 200 to the vessel 100, in some examples.

As is illustrated in FIGS. 11A-11E, the handle 200 includes a coupling 210, a spring 250, and the actuator 260. The coupling 210 is configured to readily engage and disengage from the bracket 120. For example, the coupling 210 may include an outer vertical plate 214 that enters the cavity 120c in the bracket 120. The outer vertical plate 214 may have any shape and/or size that allows it to fit within the cavity 120c in the bracket 120. In the illustrated example, the outer vertical plate 214 is shaped as two adjacent upright cones. The cones may matingly engage with the opening 120c (which is the form of two adjacent conical slots that substantially match the shape and size of the upright cones of the outer vertical plate 214). The two adjacent cones are optionally split (as is seen in FIG. 11B), which may them more compressible to provide a snugger fit within the bracket 120, in some examples. In other examples, the outer vertical plate 214 may be a single cone, a U-shaped wedge (similar to that discussed above), any other shape (and any size) that allows the outer vertical plate 214 to fit within the cavity 120c in the bracket 120. In some examples, the coupling 210 and the outer vertical plate 214 may be made of casting metal.

As is illustrated in FIG. 11B, the coupling 210 may further include a tilted shelf positioned behind the outer vertical plate 214. This shelf may contains an upward and forward facing shaft 279. The shaft 279 may center and stabilize the position of the spring 250. The actuator 260 may have a complimentary extending shaft 281 to center and stabilize the other side of the spring 250.

The spring 250 may apply a force to the actuator 260. In the illustrated example, the spring 250 is a torsion or compression spring. The spring 250 may be positioned at a tilt, as is illustrated in FIGS. 11A-11E. As a result, the force from the spring 250 may cause the actuator 260 to rotate forwards (i.e., to the left in FIGS. 11A-11E) in a counter-clockwise direction. This rotation may allow the actuator 260 to engage (e.g., clamp onto, clip into) a portion of the bracket 120, so as to assist in securing the handle 200 to the vessel 100. The force from the spring 250 may also resist rotation of the actuator 260 backwards (i.e., to the right in FIGS. 11A-11E) in a clockwise direction.

As is discussed above, the actuator 260 is configured to engage (e.g., clip into, clamp onto) a portion of the bracket 120. This may assist in securing the handle 200 to the vessel 100, in some examples. For example, it may lock the handle 200 in place with the vessel 100, thereby eliminating (or reducing) any "play" between the two components.

The actuator 260 may engage any portion of the bracket 120. For example, as is illustrated in FIGS. 11A-11E, the actuator 260 may engage an upper edge 128 of the bracket 120. To assist in this engagement, the actuator 260 may include one or more outwardly extending structures (e.g., a lip, ridges, etc.) that may fit into corresponding inwardly extending structures (e.g., a divot, an aperture) included on the upper edge 128 of the bracket 120 (or vice versa). The engagement may be further assisted by the rotational movement of the actuator 260 discussed above (e.g., the rotational movement in the counter-clockwise direction, causing a clamping motion). To create this rotational movement, the actuator 260 may include one or more rotational couplings 265 that rotatingly couple the actuator 260 to the coupling 210, as is illustrated in FIG. 11C. The rotational coupling 265 may be an arm that includes two opposing bores. Each of these bores may receive a respective cylindrical shaft 267 that faces inward from opposing upright cones of the outer vertical plate 214, as is illustrated in FIGS. 11B and 11C. The rotational axis of the actuator 260 is thus defined by the common axis of the bore and cylinders 267, in some examples.

Although the actuator 260 is discussed above as engaging with a portion of the bracket 120, in some example, the actuator 260 may alternatively (or additionally) engage with the flange 115 (to which the bracket 120 may be attached or integrated with, as is discussed above).

The actuator 260 may further include a downward and backward facing shaft 281. Similar to shaft 279 of the coupling 210, the shaft 281 of the actuator 260 may center and stabilize the position of the spring 250.

FIGS. 11D-11E are partial side cross-sectional views showing an example sequence of steps for attaching the handle 200 to the bracket 120 of the vessel 100. As is seen in FIG. 11D, when the handle 200 is moved upward by the user, a top front edge of the actuator 260 (which may include one or more facets, as is discussed above) may contact a lower edge of the bracket 120. The contact (when combined with the upward force provided by the user) may cause the actuator 260 to rotate backwards (i.e., to the right in FIGS. 11D-11E) in a clockwise direction. This may prevent the user from having to engage the actuator 260 in order to attach the handle 200 to the vessel 100. The user may then continue to move the handle 200 upward, causing the outer vertical plate 214 (in the form of two adjacent upright cones) to enter the cavity 120c (which is the form of two adjacent conical slots that substantially match the shape and size of the upright cones of the outer vertical plate 214).

As is seen in FIG. 11E, the upward movement of the handle 200 causes the actuator 260 to move upward over the upper edge 128 of the bracket 120. When this occurs, the force from the spring 250 (not illustrated in FIGS. 11D-11E) may rotate the actuator 260 forward (i.e., to the left in FIGS. 11D-11E) in a counter-clockwise direction. As such, the actuator 260 may engage (e.g., clip into, clamp onto) the upper edge 128 of the bracket 120, so as to assist in securing the handle 200 to the vessel 100. In some examples, the rotational clamping motion of the actuator 260 may cause the handle 200 to continue to attach to the vessel 100 even if the user stops pushing the handle 200 upwards, as is discussed above.

To remove the handle 200, the user may push down on the actuator 260, causing it to rotate backwards (i.e., to the right in FIGS. 11D-11E) in a clockwise direction. Then the user may move the handle 200 downward in relation to the vessel 100, causing the outer vertical plate 214 (in the form of two adjacent upright cones) to exit the cavity 120c (which is the form of two adjacent conical slots that substantially match the shape and size of the upright cones of the outer vertical plate 214). This may detach the handle 200 from the vessel 100.

Figure 12A:
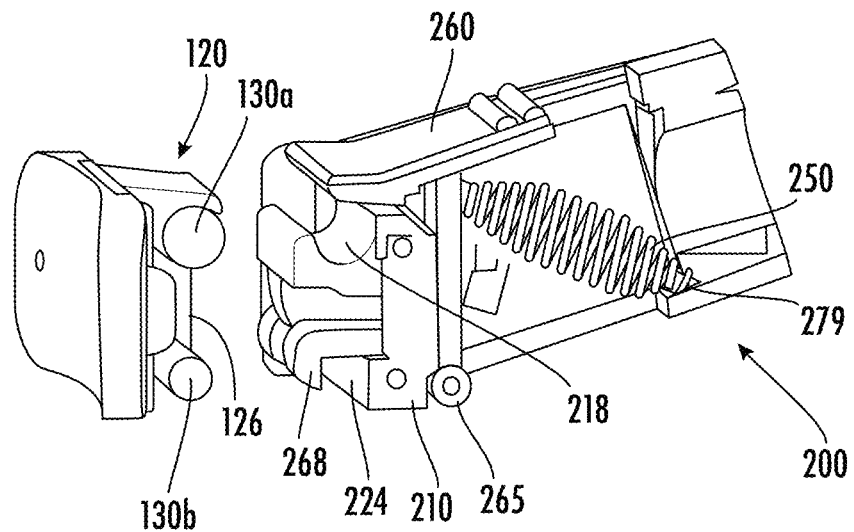
FIGS. 12A-12J illustrate another example of a handle that may be detached and re-attached to the vessel, and also illustrate another example of a bracket that may be used to detach and re-attach the handle to the vessel.
Figure 12B:
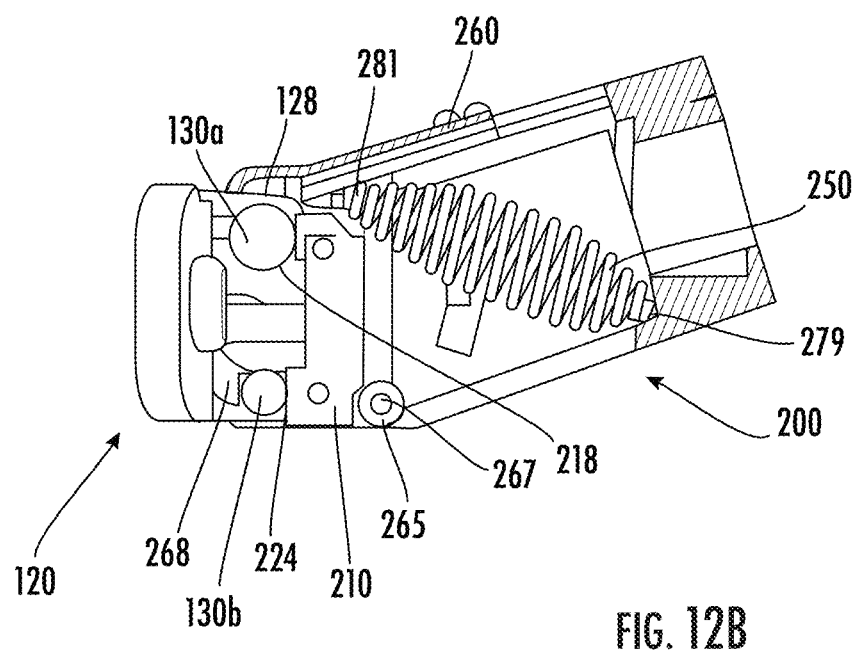
Figure 12C:
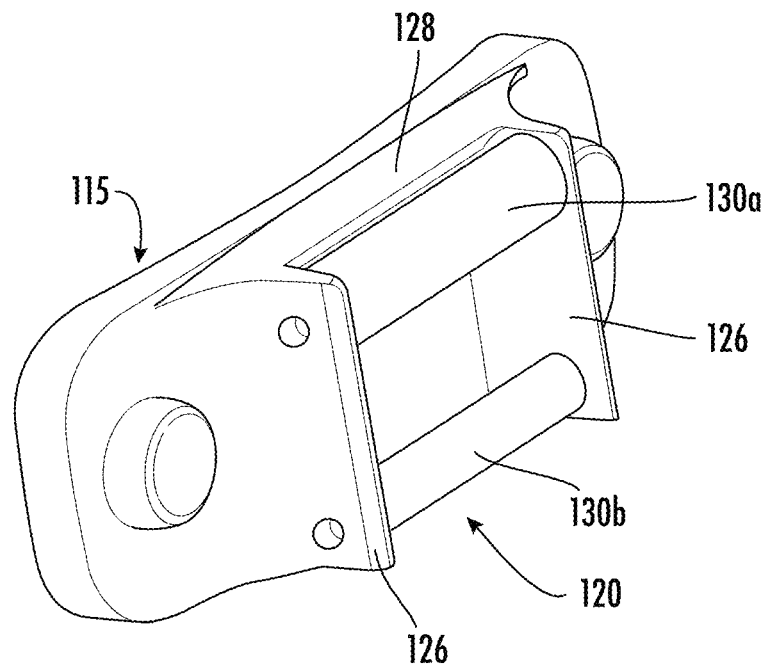
Figure 12D:
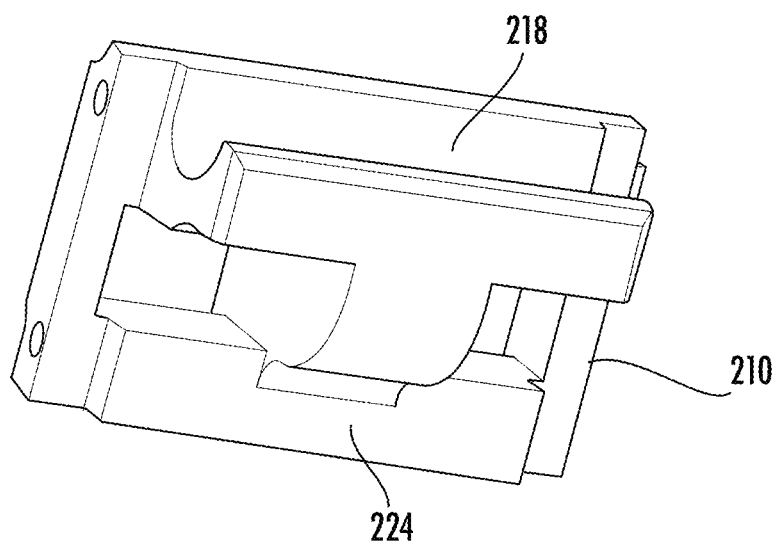
Figure 12E:
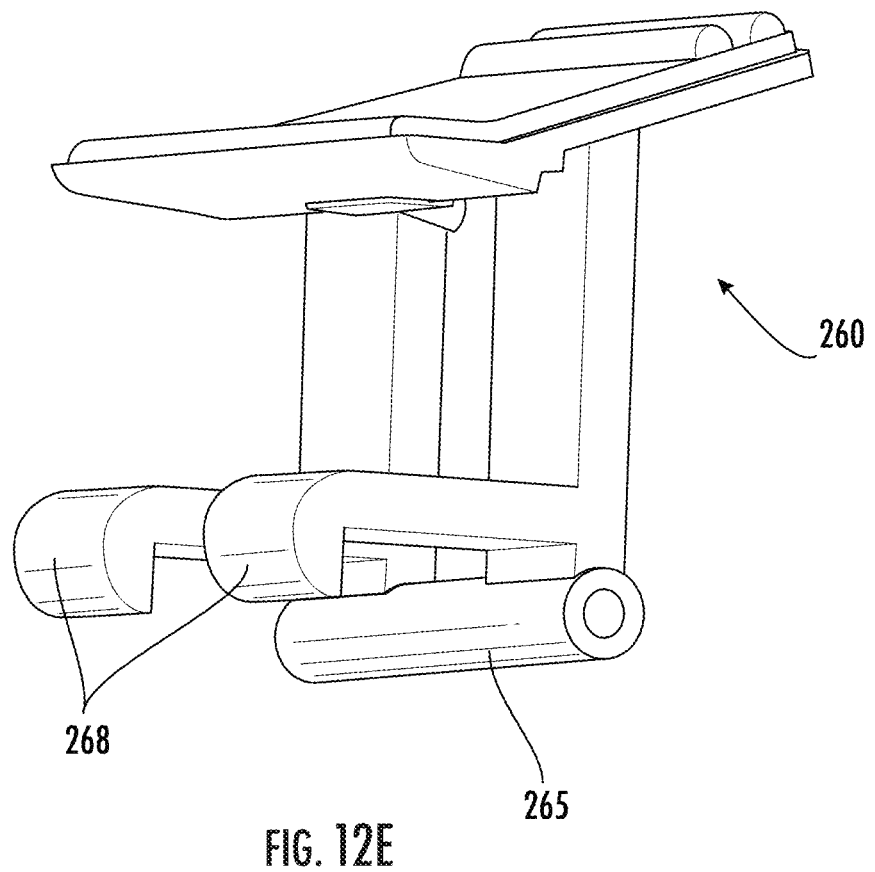

FIGS. 12A-12J illustrate another example of a handle 200 that may be detached and re-attached to the vessel 100, and also illustrate another example of a bracket 120 that may be used to detach and re-attach the handle 120 to the vessel 100. FIG. 12A is a cross-sectional view of the handle 200 detached from the bracket 120. FIG. 12B is a cross-sectional view of the handle 200 attached to the bracket 120. FIG. 12C is a perspective view of the bracket 120. FIG. 12D is a perspective view of a coupling 210 of the handle 200. FIG. 12E is a perspective view of an actuator 260 of handle 200. FIGS. 12F-12J illustrate, in schematic cross-sectional elevation views, an example sequence of steps for detaching the handle 200 from the vessel 100.

In the example illustrated in FIGS. 12A-12J, the bracket 120 does not include a cavity 120c and aperture 122 (and one or more other components shown in FIGS. 1A-8B). Instead, the bracket 120 includes two sidewalls 126, and two rods 130 that extend horizontally between the two sidewalls 126, as is seen in FIG. 12C. The two rods 130 include an upper rod 130a, and further include a lower rod 130b that is spaced apart from the upper rod 130a by a vertical distance. Each rod 130 may have any shape and/or size that allows handle 200 to be attached to the bracket 120 via the rods 130. In the illustrated example, the rods 130 have a cylindrical shape, with the upper rod 130a having a larger diameter than the lower rod 130b.

As is also illustrated in FIGS. 12A-12J, the handle 200 includes a coupling 210, a spring 250, and the actuator 260. The coupling 210 is configured to readily engage and disengage from the bracket 120. For example, the coupling 210 may be positioned up against the rods 130, allowing the coupling 210 to engage with the bracket 210. In the illustrated example, the coupling 210 includes a channel 218 that may fit against the upper rod 130a, so as to at least partially surround the upper rod 130a. The channel 218 may have any shape and/or size. As is illustrated, the channel 218 is shaped as a semi-cylindrical channel with an upward facing opening for engaging the upper rod 130a, so as to at least partially surround the upper rod 130a. The coupling 210 may further include an indented bottom portion 224 that may be positioned against a side portion of the lower rod 130b. The indented bottom portion 224 may operate in conjunction with one or more hooks 268 of the actuator 260 (discussed below) so as to at least partially surround the lower rod 130*b*.

The spring 250 may apply a force to the actuator 260. In the illustrated example, the spring 250 is a torsion or compression spring. The spring 250 may be positioned at a tilt, as is illustrated in FIGS. 12A-12J. As a result, the force from the spring 250 may cause the actuator 260 to rotate forwards (i.e., to the left in FIGS. 12A-12J) in a counter-clockwise direction. This rotation may allow the actuator 260 to engage (e.g., clamp onto, clip into) a portion of the bracket 120, so as to assist in securing the handle 200 to the vessel 100. The force from the spring 250 may also resist rotation of the actuator 260 backwards (i.e., to the right in FIGS. 12A-12J) in a clockwise direction.

To position the spring 250 at a tilt, the handle 200 may include an upward and forward facing shaft 279 positioned within a cavity in the handle 200. The shaft 279 may center and stabilize the position of the spring 250. The actuator 260 may have complimentary extending shaft 281 to center and stabilize the other side of the spring 250.

The actuator 260 is configured to engage (e.g., clip into, clamp onto) a portion of the bracket 120. This may assist in securing the handle 200 to the vessel 100, in some examples. For example, it may lock the handle 200 in place with the vessel 100, thereby eliminating (or reducing) any "play" between the two components.

The actuator 260 may engage any portion of the bracket 120. For example, as is illustrated in FIGS. 12A-12J, the actuator 260 may engage an upper edge 128 of the bracket 120. To assist in this engagement, the actuator 260 may include one or more outwardly extending structures (e.g., a lip, ridges, etc.) that may fit into corresponding inwardly extending structures (e.g., a divot, an aperture) included on the upper edge 128 of the bracket 120 (or vice versa). The engagement may be further assisted by the rotational movement of the actuator 260 discussed above (e.g., the rotational movement in the counter-clockwise direction, causing a clamping motion). To create this rotational movement, the actuator 260 may include one or more rotational couplings 265 that rotatingly couple the actuator 260 to an inside portion of the handle 200, as is illustrated in FIG. 12B. In some examples, the rotational couplings 265 may rotatingly couple the actuator 260 to a lower shell 232 of the handle 200. In other examples, the rotational couplings 265 may rotatingly couple the actuator 260 to the back side of the coupling 210.

In the illustrated example, the rotational coupling 265 is a single arm that includes two opposing bores (or a single bore that extends entirely through the arm). Each of these bores may receive a respective cylindrical shaft 267 that faces inward. The rotational axis of the actuator 260 is thus defined by the common axis of the bore and cylinders 267, in some examples.

Although the actuator 260 is discussed above as engaging with a portion of the bracket 120, in some example, the actuator 260 may alternatively (or additionally) engage with the flange 115 (to which the bracket 120 may be attached or integrated with, as is discussed above).

As is illustrated, the actuator 260 is further configured to engage the lower rod 130*b* of the bracket 120. For example, the actuator 260 may include one or more hooks 268 that may engage the lower rod 130*b* of the bracket 120. In the illustrated example, the actuator 260 includes two forward facing hooks 268 that are positioned at a location vertically below the channel 218 of the coupling 210. In the illustrated example, the hooks 268 are spaced apart from each other (e.g., they are on opposing sides of the actuator 260), and are positioned on the bottom of the actuator 260 at (or relatively adjacent) the pivot axis at the bottom thereof.

When engaged with the lower rod 130*b*, the hooks 268 may extend over the top and front side of the lower rod 130*b*, thereby squeezing the lower rod 130*b* in-between the hooks 268 of the actuator 260 and the indented bottom portion 224 of the coupling 210. Furthermore, when the actuator 260 is rotated backwards (i.e., to the right in FIGS. 12A-12J) in a clockwise direction, the hooks 260 may lift upwards (by also rotating backwards) so as to disengage from the lower rod 130*b*, as is illustrated in FIG. 12G.

The actuator 260 may further include a downward and backward facing shaft 281. Similar to shaft 279 of the handle 200, the shaft 281 of the actuator 260 may center and stabilize the position of the spring 250. The spring 250 may be contained between the shaft 279 of the handle 200, and the shaft 281 of the actuator 260.

While the actuator 260 may rotate relative to the handle 200 (as is discussed above), the coupling 210 may remain fixed in place in the handle 200. As such, any movement of the handle 200 (e.g., upward, downward, rotation) causes the coupling 210 to move with the handle 200.

Figure 12F:
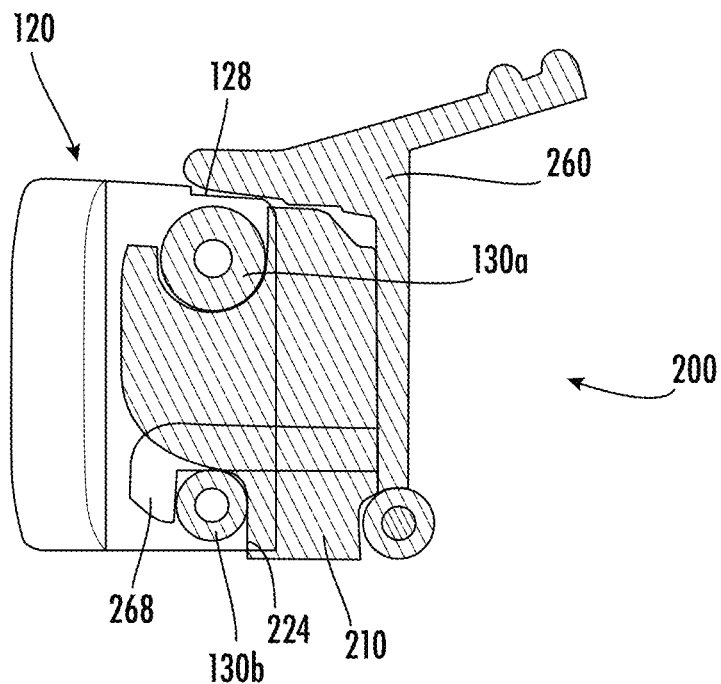
Figure 12G:
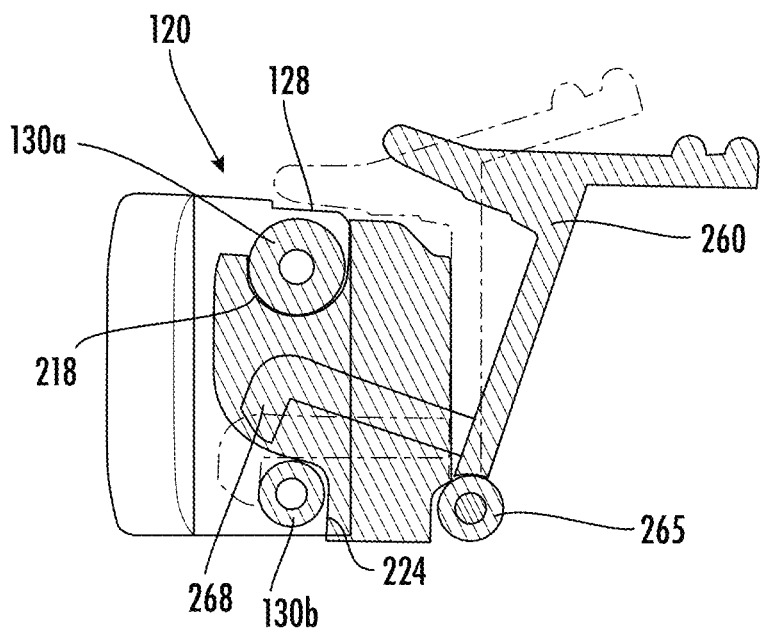

FIGS. 12F-12J illustrate, in schematic cross-sectional elevation views, an example sequence of steps for detaching the handle 200 from the vessel 100. In FIG. 12F, the handle 200 is fully attached to the bracket 120 (and therefore to the vessel 100, not shown). At FIG. 12G, a user presses on the actuator 260, causing it to rotate backwards (i.e., to the right in FIGS. 12F-12J) in a clockwise direction. This causes the hooks 268 to lift upwards (by also rotating backwards) so as to disengage from the lower rod 130*b*, as is illustrated in FIG. 12G.

Figure 12H:
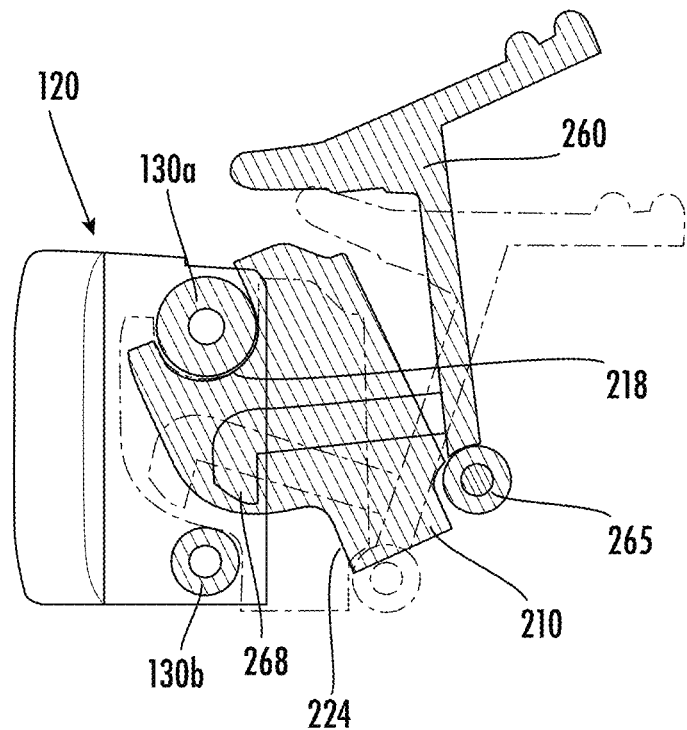

In FIG. 12H, the handle 200 is rotated upwards (e.g., counter-clockwise) relative to the bracket 120. This rotation of the handle 200 may cause the hooks 268 to be rotated to a position where they are clear from the lower rod 130*b*, as is illustrated in FIG. 12H. It may further cause the channel 218 to be rotated with respect to the upper rod 130*a*. When rotating the handle 200 in FIG. 12H, the actuator 260 may remain engaged by the user. That is, the user may continue to push the actuator 260. In other examples, the handle 200 may include a locking function that may temporarily hold the actuator 260 in its engaged position.

Figure 12I:
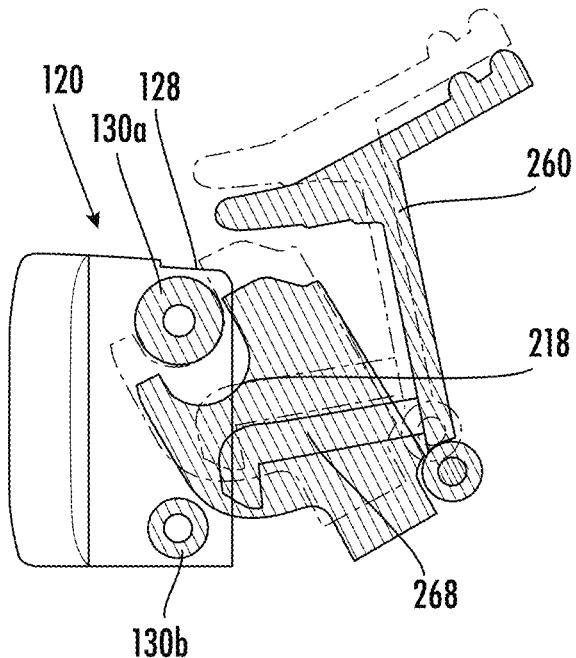
Figure 12J:
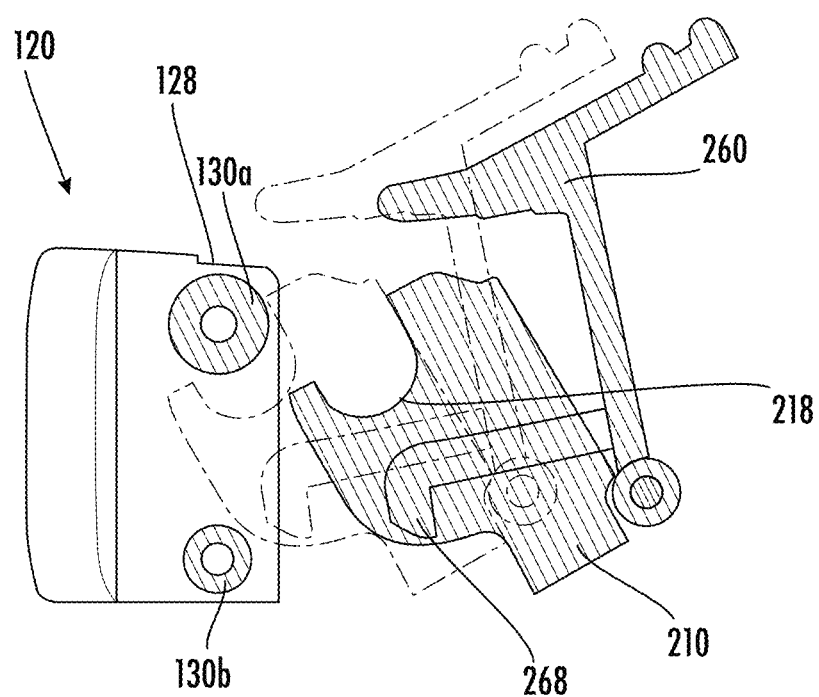

In FIG. 12I, the handle 200 is move downward and laterally away from the bracket 120. This may cause the channel 218 to disengage from the upper rod 130*a*, as is illustrated in FIG. 12I. When this occurs, the handle 200 is de-attached from the vessel 100, in some examples.

To attach the handle 200 to the vessel 100, the illustrated steps of FIGS. 12F-12J may be repeated in reverse. In doing so, when the top section of the actuator 260 is positioned vertically above the upper edge 128 of the bracket 120 and the channel 218 is engaged with the upper rod 130*a* (as is seen in FIG. 12G), the user may release the actuator 260. The compressed spring 250 (not illustrated in FIGS. 12F-12J) may then urge the actuator 260 to rotate forward. This may cause the hooks 268 to engage with the lower rod 130*b*. It may also cause the actuator 260 to engage the upper edge 128 of the bracket 120. This may firmly seat the upper rod 130*a* in the channel 218 of the coupling 210, which attaches the handle 200 to the vessel 100, in some examples. It may further eliminate (or reduce) any spacing in-between the components of the handle 200 and the vessel 100, so as to eliminate (or reduce) any "play" in-between the components, in some examples.

Modifications, additions, and/or substitutions may be made to the cookware vessel 1000 of any one or more of FIGS. 1A-12J, the components of the cookware vessel 1000 of any one or more of FIGS. 1A-12J, and/or the functions of the cookware vessel 1000 of any one or more of FIGS. 1A-12J without departing from the scope of the specification. For example, the components of the cookware vessel 1000 of any one or more of FIGS. 1A-12J may have any suitable shape, and may be made of any suitable material (e.g., casting metal). Furthermore, one or more of the components illustrated in FIGS. 1A-12J may be added to or removed from any of the cookware vessels 1000 illustrated in FIGS. 1A-12J.

The grammatical articles "one", "a", "an", and "the", as used in this specification, are intended to include "at least one" or "one or more", unless otherwise indicated. Thus, the articles are used in this specification to refer to one, or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

This specification has been written with reference to various non-limiting and non-exhaustive embodiments or examples. However, it will be recognized by persons having ordinary skill in the art that various substitutions, modifications, or combinations of any of the disclosed embodiments or examples (or portions thereof) may be made within the scope of this specification. Thus, it is contemplated and understood that this specification supports additional embodiments or examples not expressly set forth in this specification. Such embodiments or examples may be obtained, for example, by combining, modifying, or reorganizing any of the disclosed components, elements, features, aspects, characteristics, limitations, and the like, of the various non-limiting and non-exhaustive embodiments or examples described in this specification. In this manner, Applicant reserves the right to amend the claims during prosecution to add features as variously described in this specification.

What is claimed is:

1. A cookware vessel, comprising:
   a. a vessel having a bottom portion surrounded by a substantially upright sidewall that terminates at a rim to define an interior volume for holding a food item;
   b. a bracket coupled to an exterior of the substantially upright sidewall adjacent to the rim, wherein the bracket has a channel that extends upward from a lower opening in an underside of the bracket; and
   c. a detachable handle for the vessel, the handle comprising:
      (i) an elongated grip portion having a distal end and a spaced apart proximal end, in which the distal and proximal ends thereof define a principal axis of the handle;
      (ii) an elongated plate disposed within at least a portion the elongated grip portion, wherein the elongated plate extends outward in a forward direction from the proximal end of the elongated grip portion, wherein the elongated plate has an elongated concave depression on an underside of the elongated plate that extends along the same direction as the principal axis;
      (iii) a U-shaped coupling having an outer vertical plate and a spaced apart inner vertical plate each connected to the other at a bottom portion thereof, wherein the inner vertical plate has an upper end that is coupled to a proximal end of the elongated plate, wherein the outer vertical plate is configured to be received within the channel of the bracket when the handle is in a secure latched engagement to the vessel;
      (iv) an elongated rod disposed to laterally translate along the underside of the elongated plate within the elongated concave depression, wherein, when the elongated rod is moved forward, a tip of the elongated rod is configured to extend through an aperture in the inner vertical plate so as to be positioned in-between the inner and outer vertical plates, wherein, when the elongated rod is moved backward, the tip of the elongated rod is configured to retract back through the aperture in the inner vertical plate, wherein the tip of the elongated rod has a nonsymmetric bevel shape defined by an upper tapered edge and a lower tapered edge that meet at a vertex disposed below a center line of the elongated rod, wherein the upper tapered edge is longer than the lower tapered edge in a principal axis of the elongated rod;
      (v) an actuator coupled, directly or indirectly, to the elongated rod, wherein the actuator is configured to be manually moved by a user, wherein the actuator is further configured, when moved by the user, to directly or indirectly move the elongated rod backward so as to cause the tip of the elongated rod to retract back through the aperture in the inner vertical plate; and
      (vi) a spring coupled to the elongated rod, wherein the spring is configured to apply a force to the elongated rod so as to move the elongated rod forward, when the actuator is released by the user, to cause the tip of the elongated rod to extend through the aperture in the inner vertical plate so as to be positioned in-between the inner and outer vertical plates.

2. The cookware vessel of claim 1, wherein the outer vertical plate of the handle and the channel of the bracket have a complementary inward and upward taper on two or more opposing sides.

3. The cookware vessel of claim 1, wherein the outer vertical plate of the handle and the channel of the bracket have a complementary inward and upward taper on three or more adjacent sides.

4. The cookware vessel of claim 1, wherein the outer vertical plate of the handle and the channel of the bracket have a complementary inward and upward taper on four adjacent sides.

5. The cookware vessel of claim 1, wherein the bracket further includes a front face having an aperture, wherein, when the outer vertical plate of the handle is at least partially positioned within the cavity of the bracket, the tip of the elongated rod is configured to extend through the aperture of the front face of the bracket.

6. The cookware vessel of claim 1, wherein the bracket is integrated with a flange that is coupled to the exterior of the substantially upright sidewall adjacent to the rim.

7. The cookware vessel of claim 1, wherein at least a portion of the actuator is positioned on or in a bottom of the elongated grip portion.

8. The cookware vessel of claim 1, wherein at least a portion of the actuator is positioned at or in the distal end of the elongated grip portion.

9. The cookware vessel of claim 8, wherein the handle further comprises:
   a rocker arm coupled directly to the actuator, and further coupled directly to a pullable arm, the rocker arm configured to rotate around a swivel point;
   the pullable arm, wherein the pullable arm is coupled directly to the elongated rod;
   wherein the actuator is further configured, when moved by the user, to indirectly move the elongated rod backward by rotating the rocker arm, which causes the pullable arm to directly move the elongated rod backward.

10. The cookware vessel of claim 1, wherein the handle is configured to detach from the vessel without the user manually moving the actuator.

11. A cookware vessel, comprising:
   a. a vessel having a bottom portion surrounded by a substantially upright sidewall that terminates at a rim to define an interior volume for holding a food item;
   b. a bracket coupled to an exterior of the substantially upright sidewall adjacent to the rim, wherein the bracket has two vertically spaced apart rods that extend horizontally along the bracket, the two rods comprising an upper rod and a lower rod; and
   c. a detachable handle for the vessel, the handle comprising:
      (i) a grip portion;
      (ii) a coupling fixedly attached to the grip portion, the coupling having a channel and an indented bottom portion, the channel configured to surround at least a portion of the upper rod when positioned against the upper rod, the indented bottom portion configured to contact a side portion of the lower rod when positioned against the lower rod;
      (iii) an actuator rotatingly coupled to the handle, the actuator having a top portion configured to engage an upper edge of the bracket when the actuator is rotated forward and further configured to disengage from the upper edge of the bracket when the actuator is manually rotated backward by a user, the actuator further having one or more hooks configured to engage the lower rod of the bracket when the actuator is rotated forward and further configured to disengage from the lower rod of the bracket when the actuator is manually rotated backward by the user; and
      (iv) a spring coupled to the actuator, wherein the spring is configured to apply a force to the actuator so as to rotate the actuator forward, when the actuator is released by the user, to cause the top portion of the actuator to engage the upper edge of the bracket, and further to cause the one or more hooks of the actuator to engage the lower rod of the bracket.

12. The cookware vessel of claim 11, wherein the two rods extend horizontally in-between two opposing sidewalls of the bracket.

13. The cookware vessel of claim 11, wherein the actuator is rotatingly coupled to a lower shell of the handle.

14. The cookware vessel of claim 11, wherein the actuator is rotatingly coupled to the coupling of the handle.

15. The cookware vessel of claim 11, wherein the one or more hooks of the actuator comprise two horizontally spaced apart hooks.

16. The cookware vessel of claim 11, wherein the two rods each have a cylindrical shape, and wherein the channel of the coupling has a semi-cylindrical shape.

17. A cookware vessel, comprising:
   a. a vessel having a bottom portion surrounded by a substantially upright sidewall that terminates at a rim to define an interior volume for holding a food item;
   b. a bracket coupled to an exterior of the substantially upright sidewall adjacent to the rim, wherein the bracket has a channel that extends upward from a lower opening in an underside of the bracket; and
   c. a detachable handle for the vessel, the handle comprising:
      (i) a coupling fixedly attached to the handle, the coupling having an outer vertical plate that is configured to be received within the channel of the bracket;
      (ii) an actuator rotatingly coupled to the coupling, the actuator having a top portion configured to engage an upper edge of the bracket when the actuator is rotated forward and further configured to disengage from the upper edge of the bracket when the actuator is manually rotated backward by a user; and
      (iii) a spring coupled to the actuator, wherein the spring is configured to apply a force to the actuator so as to rotate the actuator forward, when the actuator is released by the user, to cause the top portion of the actuator to engage the upper edge of the bracket.

18. The cookware vessel of claim 17, wherein the outer vertical plate of the coupling comprises two spaced apart upright cones, and wherein the channel of the bracket comprises two spaced apart conical slots.

19. The cookware vessel of claim 18, wherein the spring is tilted upward and forward relative to the handle.

20. A cookware vessel, comprising:
   a. a vessel having a bottom portion surrounded by a substantially upright sidewall that terminates at a rim to define an interior volume for holding a food item;
   b. a bracket coupled to an exterior of the substantially upright sidewall adjacent to the rim, wherein the bracket has a channel that extends upward from a lower opening in an underside of the bracket; and
   c. a detachable handle for the vessel, the handle comprising:
      (i) a grip portion;
      (ii) a U-shaped coupling that is coupled to the grip portion, the U-shaped coupling having an outer vertical plate and a spaced apart inner vertical plate each connected to the other at a bottom portion, wherein the outer vertical plate is configured to be received within the channel of the bracket, the inner vertical plate comprising an aperture;
      (iii) a rod configured to laterally translate along the handle, wherein, when the elongated rod is moved forward, a tip of the elongated rod is configured to extend through the aperture in the inner vertical plate so as to be positioned in-between the inner and outer vertical plates, wherein, when the elongated rod is moved backward, the tip of the elongated rod is configured to retract back through the aperture in the inner vertical plate, wherein the rod has two stops that project orthogonally from the rod;
      (iv) an actuator having an aperture through which the rod extends so that a back portion of the actuator is in contact with a forward portion of the two stops of the rod, wherein the actuator is configured to be manually moved by a user, wherein the actuator is further configured, when moved by the user, to move the rod backward so as to cause the tip of the rod to retract back through the aperture in the inner vertical plate; and (v) a spring having an aperture through which the rod extends so that a forward portion of the spring is in contact with a back portion of the two stops of the rod, wherein the spring is configured to apply a force to the rod so as to move the rod forward, when the actuator is released by the user, to cause the tip of the rod to extend through the aperture in the inner vertical plate so as to be positioned in-between the inner and outer vertical plates.

\* \* \* \* \*